(12) United States Patent
Amitai et al.

(10) Patent No.: US 10,649,224 B2
(45) Date of Patent: May 12, 2020

(54) DYNAMIC FULL THREE DIMENSIONAL DISPLAY

(71) Applicant: OORYM OPTICS LTD., Rehovot (IL)

(72) Inventors: Yaakov Amitai, Rehovot (IL); Mori Amitai, Rehovot (IL); Menachem Amitai, Rehovot (IL)

(73) Assignee: OORYM OPTICS LTD., Rehovot (IL)

( * ) Notice: Subject to any disclaimer, the term of this patent is extended or adjusted under 35 U.S.C. 154(b) by 106 days.

(21) Appl. No.: 15/999,301

(22) PCT Filed: Feb. 15, 2017

(86) PCT No.: PCT/IL2017/050193
§ 371 (c)(1),
(2) Date: Aug. 17, 2018

(87) PCT Pub. No.: WO2017/141241
PCT Pub. Date: Aug. 24, 2017

(65) Prior Publication Data
US 2019/0041657 A1    Feb. 7, 2019

(30) Foreign Application Priority Data
Feb. 18, 2016    (IL) .......................................... 244180

(51) Int. Cl.
*G02B 27/42*    (2006.01)
*G02B 27/01*    (2006.01)
(Continued)

(52) U.S. Cl.
CPC ..... *G02B 27/4205* (2013.01); *G02B 27/0172* (2013.01); *G02B 27/4272* (2013.01);
(Continued)

(58) Field of Classification Search
CPC ............ G02B 27/4205; G02B 27/0172; G02B 27/4272; G02B 2027/0174;
(Continued)

(56) References Cited

U.S. PATENT DOCUMENTS

| 5,825,523 A | 10/1998 | Amitai |
| 8,811,823 B2 | 8/2014 | Amitai |

FOREIGN PATENT DOCUMENTS

| DE | 197 48 802 | 5/1998 |
| DE | 10 2010 043 061 | 7/2011 |

(Continued)

OTHER PUBLICATIONS

European Patent Office, European International Seach Report and Written Opinion of the International Searching Authority, PCT/IL2017/050193, dated Jun. 1, 2017, 21 pages.

*Primary Examiner* — Wen Huang

(57) ABSTRACT

There is provided an optical display system, including a light source, a control unit, and an array of at least two juxtaposed double grating elements, each of the elements comprising a first grating and a second grating, spaced apart at a constant distance from each other, each of the two gratings having at least two edges and comprises at least one sequence of a plurality of lines, wherein the spacing between the lines gradually changes from one edge of the grating to the other edge, and wherein the first grating diffracts a light wave from the light source towards the second grating and is further diffracted by the second grating as an output light wave in a given direction.

20 Claims, 18 Drawing Sheets

(51) Int. Cl.
*G02F 1/1335* (2006.01)
*G02F 1/13357* (2006.01)

(52) U.S. Cl.
CPC ...... *G02F 1/1336* (2013.01); *G02F 1/133504* (2013.01); *G02F 1/133553* (2013.01); *G02B 2027/0174* (2013.01); *G02F 2001/133616* (2013.01)

(58) Field of Classification Search
CPC ......... G02F 1/133504; G02F 1/133553; G02F 1/1336; G02F 2001/133616
See application file for complete search history.

(56) References Cited

FOREIGN PATENT DOCUMENTS

| EP | 0 329 430 | 8/1989 |
|---|---|---|
| WO | WO 2012/172295 | 12/2012 |

DYNAMIC FULL THREE DIMENSIONAL DISPLAY

FIELD OF THE INVENTION

The present invention relates to novel dynamic display sources, and particularly to displays which perform operations that cannot be performed by currently available technologies.

The invention can be implemented to advantage in a large number of imaging applications, such as, dynamic full three-dimensional displays, compact and high-efficient micro-displays, Fourier transform lensless displays, as well as non-imaging applications, such as backlight illumination for color-sequential displays.

BACKGROUND OF THE INVENTION

One of the most desired and sought after devices in the rapidly expanding market of consumer electronics is a dynamic real three-dimensional display, namely, the required device should be a display which is capable of projecting into the eyes of a viewer a dynamic three dimensional display with full color, high resolution and exceptional performance Presently, there are numerous technologies achieving stereoscopic displays, which provide simultaneously different images to the viewer's left and right eyes. As a result, the viewer has the illusion of looking at a stereoscopic object. These technologies include Head-Mounted Displays (HMDs), anaglyph, polarization-based displays, eclipse method, interference filters technologies and others. The main drawback of this family of displays is that only two points of view from the object are projected into the viewer's eye and the image is not sensitive to the movements of the head or the viewer's eyes. In addition, usually another external accessory, such as a pair of specially dedicated eyeglasses, is required to fully achieve the stereoscopic display.

The strive for a display having the capability of projecting a full, as well as dynamic three-dimensional image to the viewer's eyes, has led to several different complex optical solutions, including: volumetric, holographic and integral displays, all of which are either not really dynamic, or alternatively, fail to project a full three-dimensional display. Furthermore, these technologies can be usually effected only for comparatively small or medium devices. As a result, there is currently no existing technology that can supply a real dynamic, as well as full three-dimensional display, on wide screens having satisfactory performance.

The teachings included in U.S. Pat. Nos. 7,460,302 and 8,811,823, both in the name of Applicant, are herein incorporated by references.

DISCLOSURE OF THE INVENTION

The present invention facilitates the design and fabrication of a new family of displays for, amongst other applications, dynamic full three-dimensional displays. The invention allows high performance and full color even for large screen displays. The optical system offered by the present invention is particularly advantageous because it can supply displays having unique characteristics which cannot be found in the state-of-the-art implementations, and yet it can readily be incorporated even into optical systems having specialized configurations, utilizing obtainable fabrication techniques.

A further object of the present invention is to provide a compact, high efficient and back-illuminated micro-display. In today's micro-displays market, the devices are Processing (DLP) (which complicates the either front-illuminated such as Liquid Crystal on Silicone (LCoS) and Digital Light optical design of the system), or of very low efficiency, such as a liquid Crystal Display (LCD). Other micro-display sources suffer inherently from low achievable maximal brightness. The present invention enables a micro-display system having a simple back-illumination approach, a potential for a high efficiency and practically unlimited maximal brightness.

It is a further object of the invention to provide a relatively inexpensive and simple Fourier-transform display, namely, a display wherein each of the points in the projected display is presented by collimated light waves, instead of a diverging light wave from a singular pixel, as is the case in conventional displays. This kind of display is particularly advantageous for optical systems, such as HMDs, wherein a collimated image is required. Utilizing a Fourier-transform display, instead of a conventional display, will avoid the requirement for a complicated and cumbersome collimating module.

It is a still further object of the invention to provide a novel illumination method for color-sequential display, wherein the back light efficiently illuminates the red, green and blue (RGB) color subpixels, without the necessity for decreasing the brightness of the system by a factor of three, using the color filters in front of the subpixels.

A broad object of the present invention is therefore to alleviate the drawbacks of state-of-the-art compact optical display devices and to provide other optical components and systems having improved performance, according to specific requirements.

In accordance with the present invention there is therefore provided an optical display system comprising a light source, a control unit, and an array of at least two juxtaposed double grating elements, each of the elements comprising a first grating and a second grating, spaced apart at a constant distance from each other, each of the two gratings having at least two edges and comprises at least one sequence of a plurality of lines, wherein the spacing between the lines gradually changes from one edge of the grating to the other edge, and wherein the first grating diffracts a light wave from the light source towards the second grating and is further diffracted by the second grating as an output light wave in a given direction.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIGS. 1A, 1B and 1C are diagrams illustrating arrangements of a double grating element, wherein one of the gratings can be laterally translated;

FIGS. 2A, 2B and 2C are diagrams illustrating another arrangement of a double grating element, wherein the refractive index of substrate between the gratings is dynamically, externally controlled;

Figure 3A:
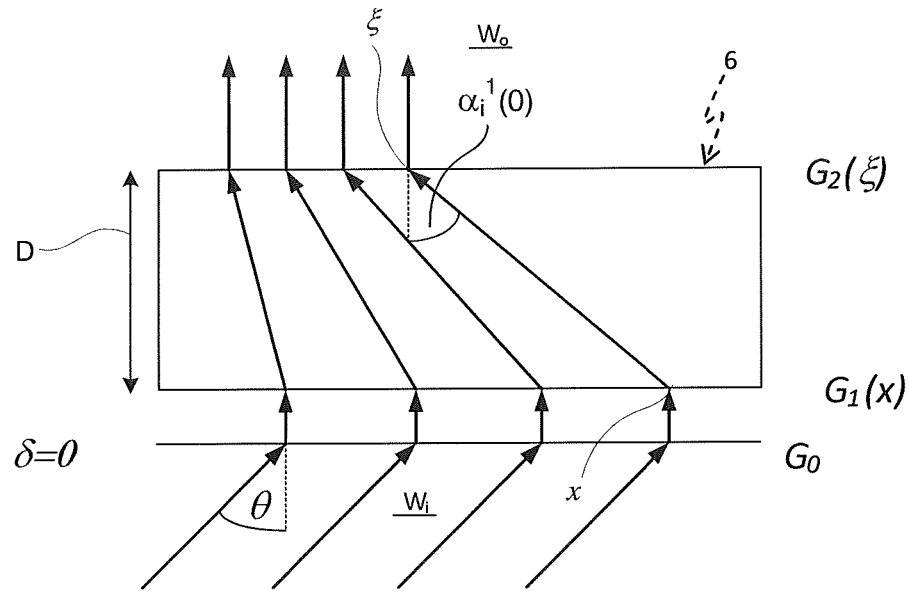
Figure 3B:
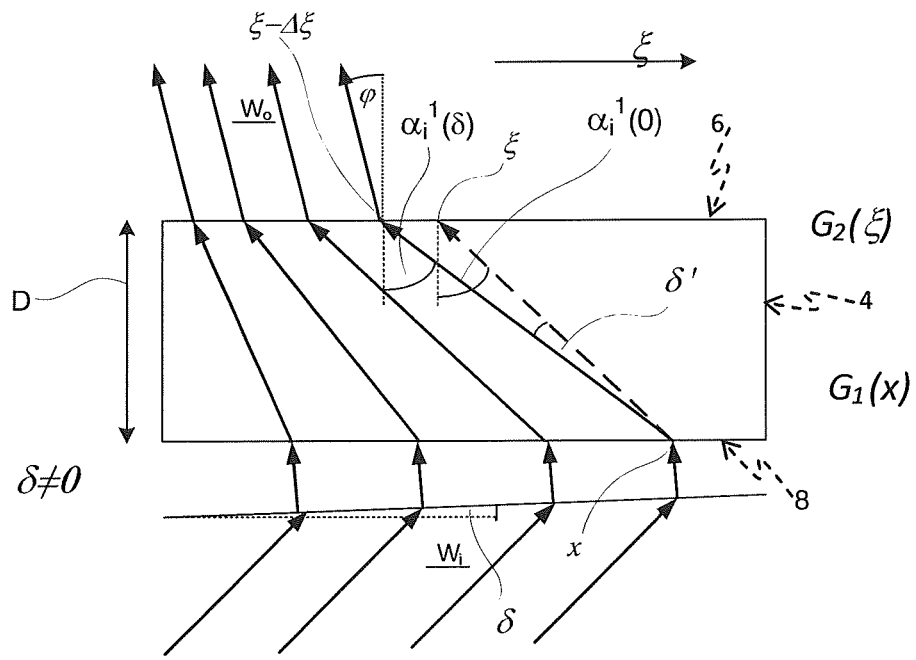
Figure 4:
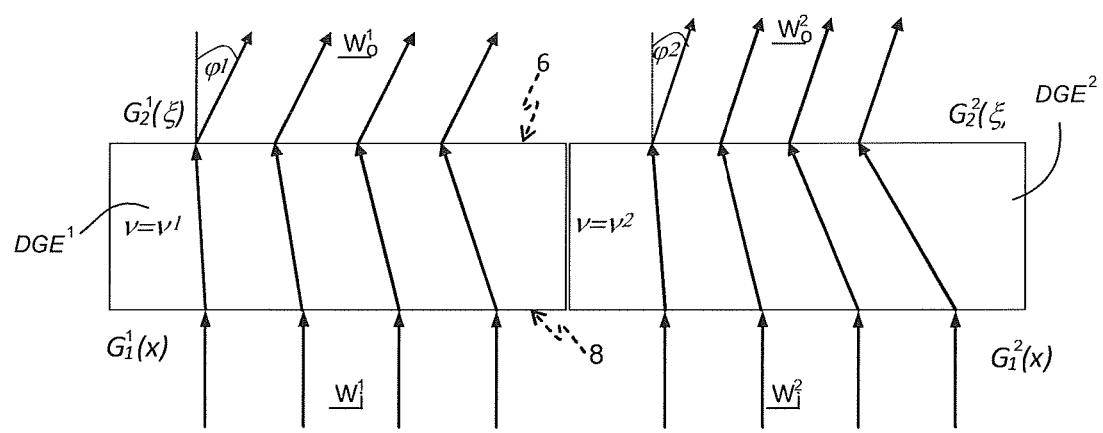
Figure 5A:
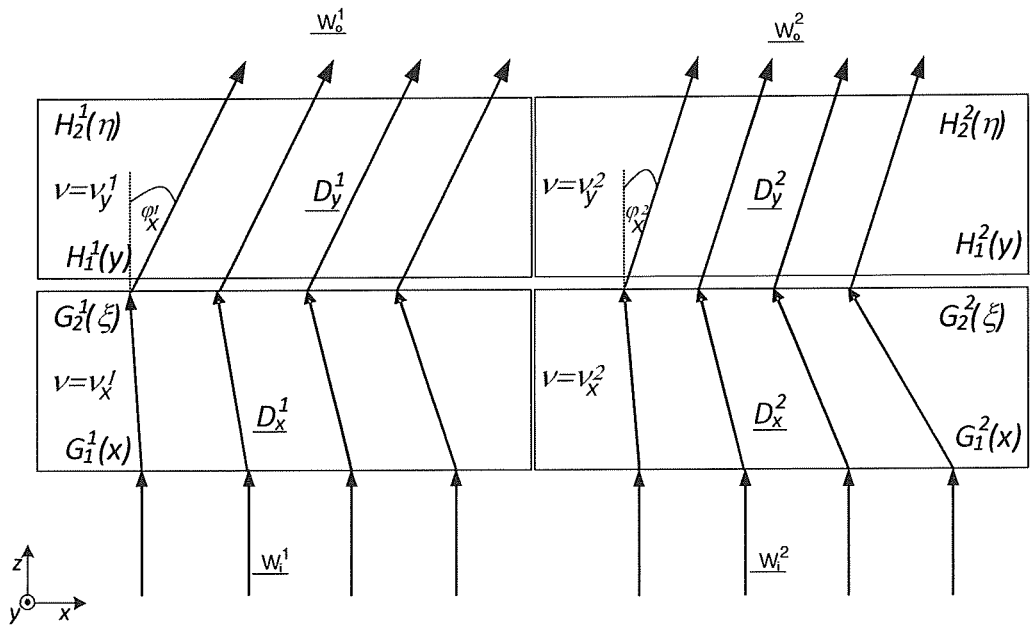
Figure 5B:
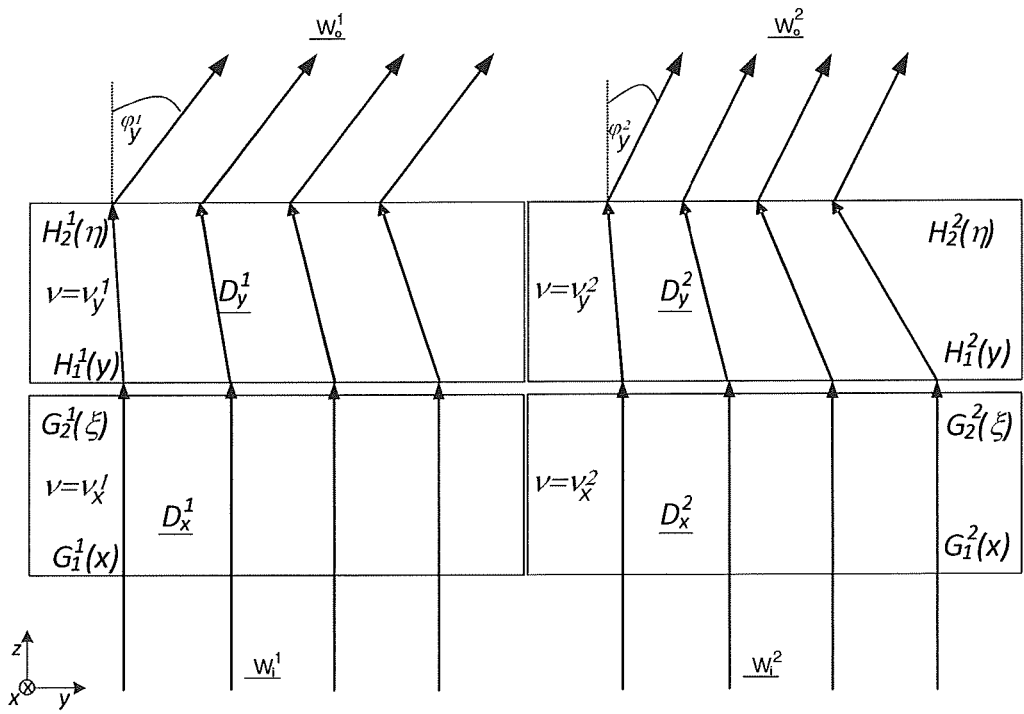
Figure 6A:
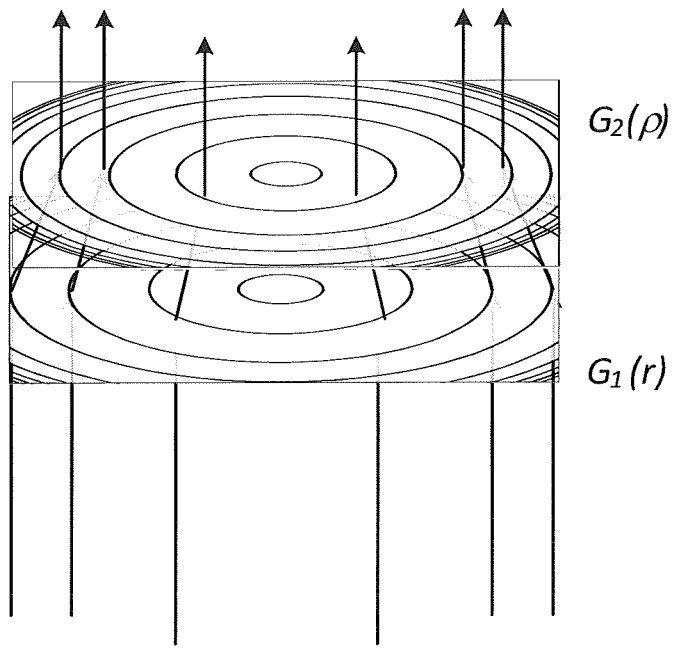
Figure 6B:
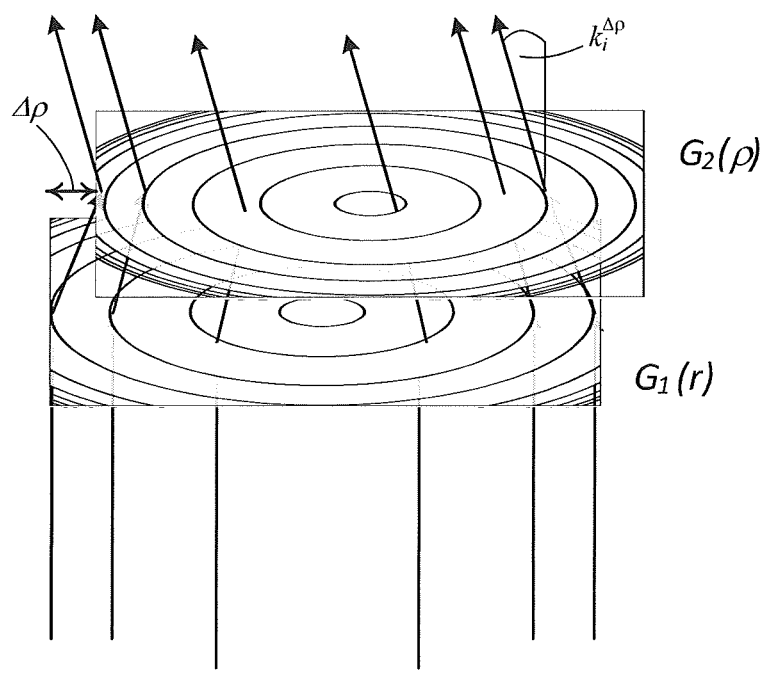
Figure 7:
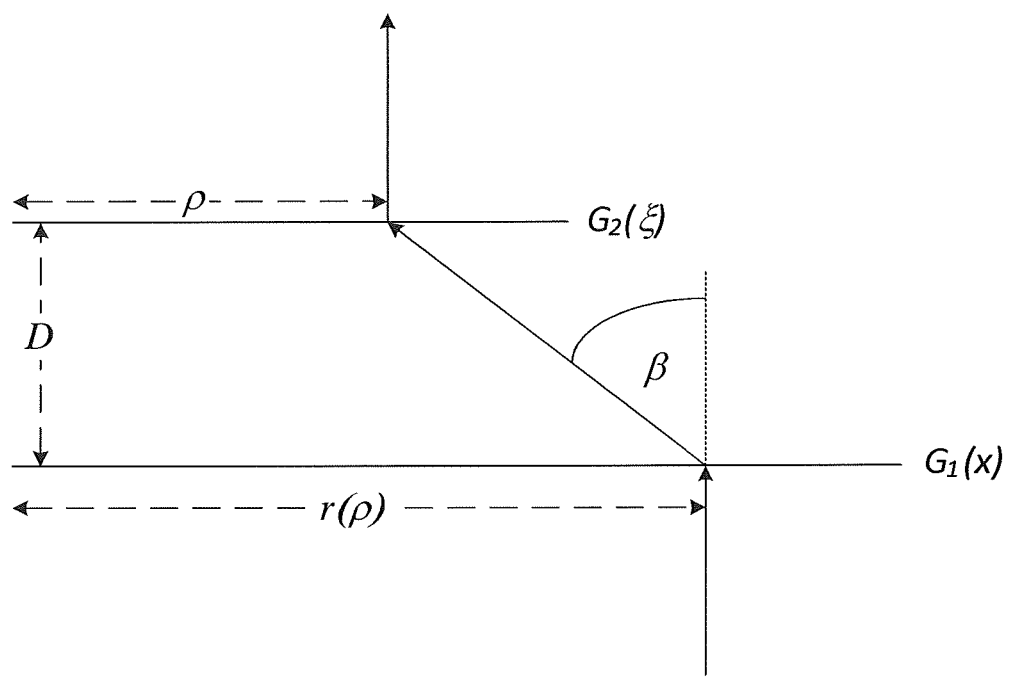
Figure 8A:
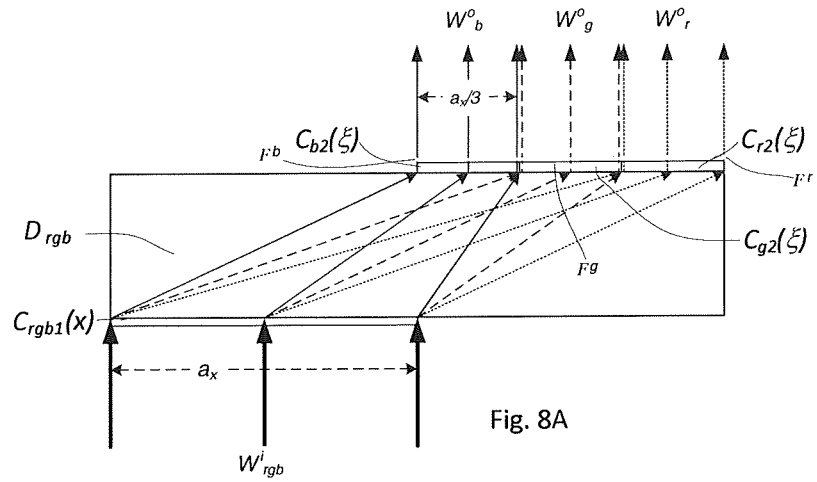
Figure 8B:
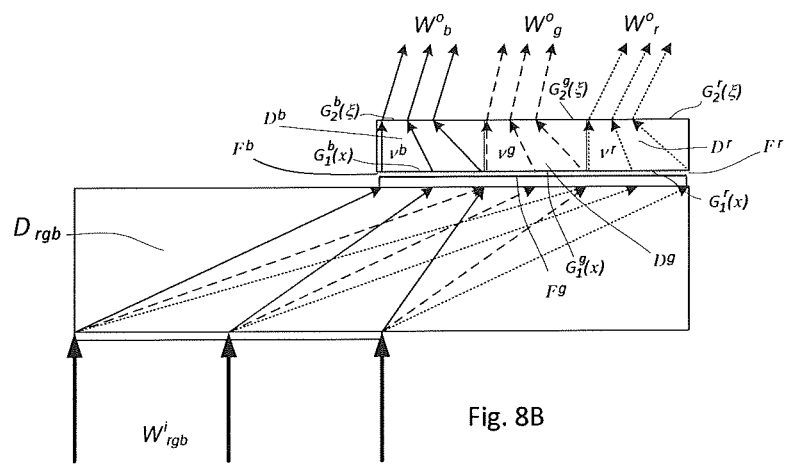
Figure 8C:
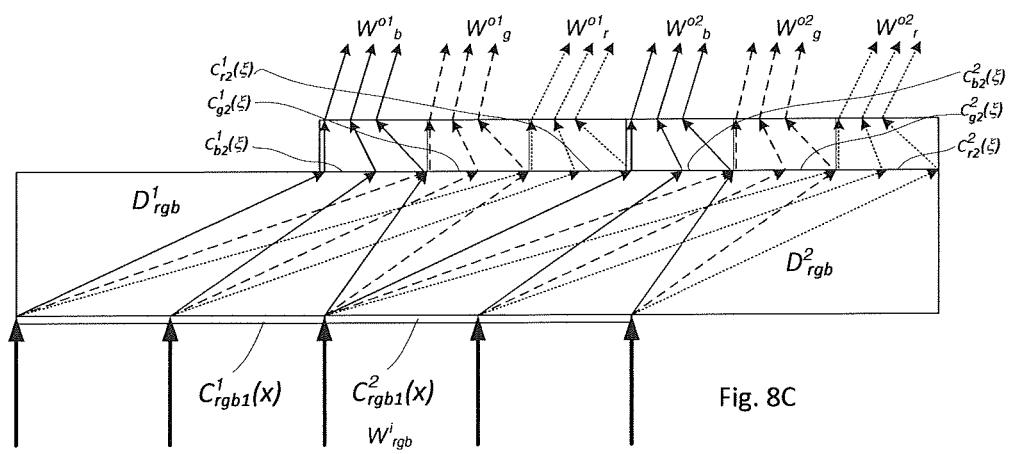
Figure 9A:
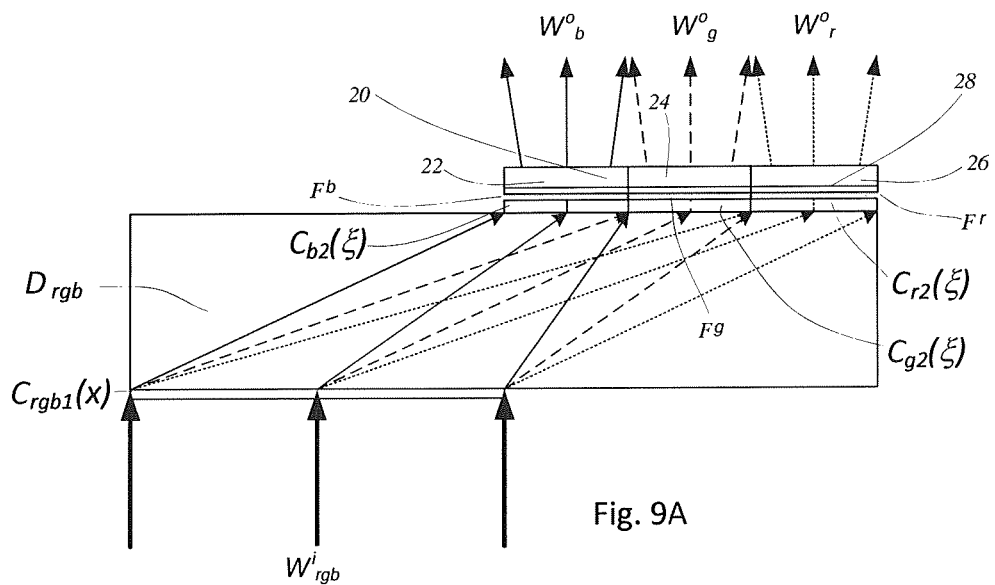
Figure 9B:
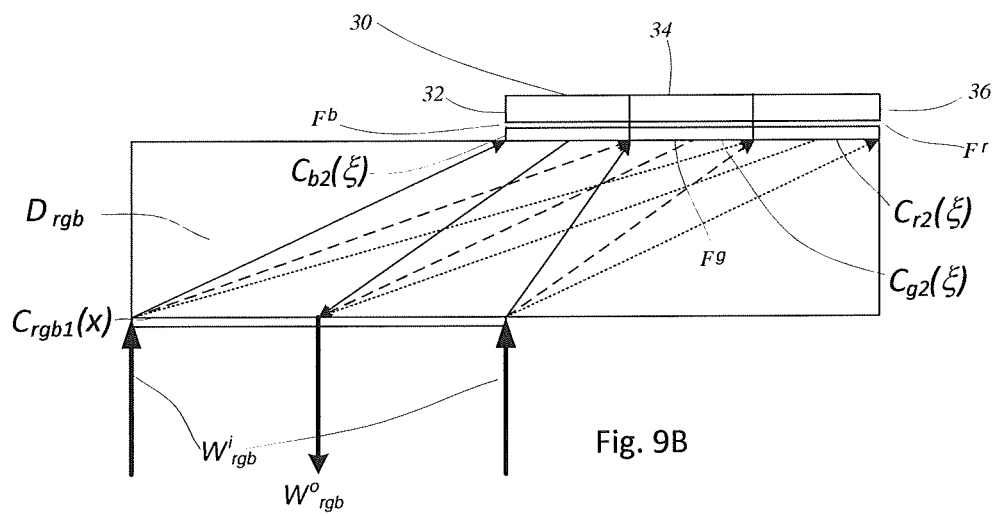
Figure 10A:
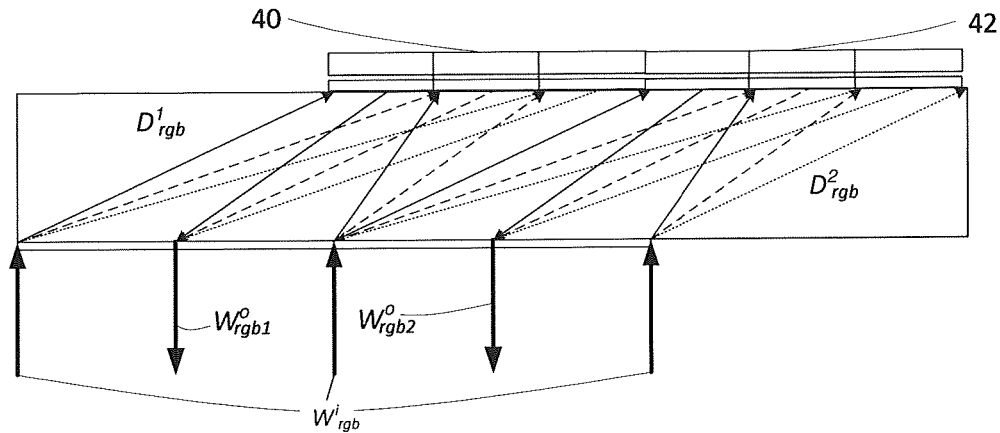
Figure 10B:
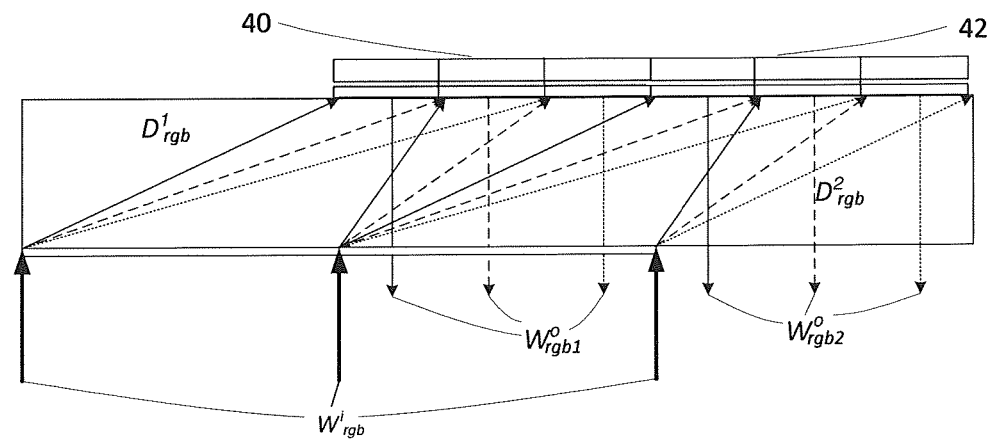
Figure 10C:
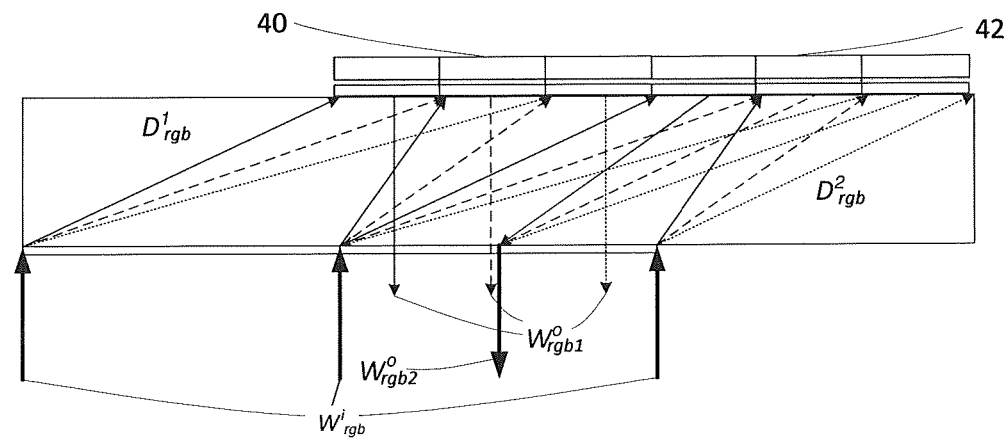
Figure 11A:
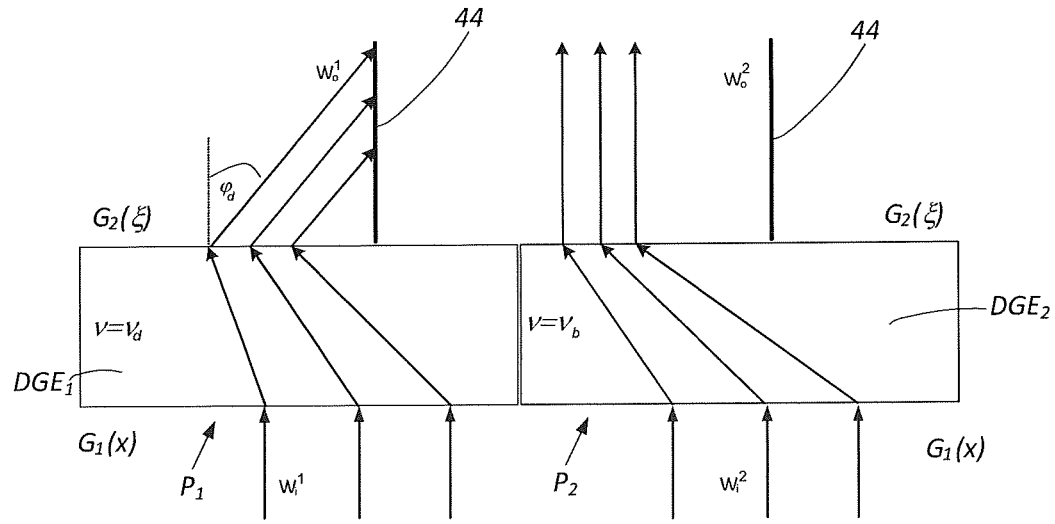
Figure 11B:
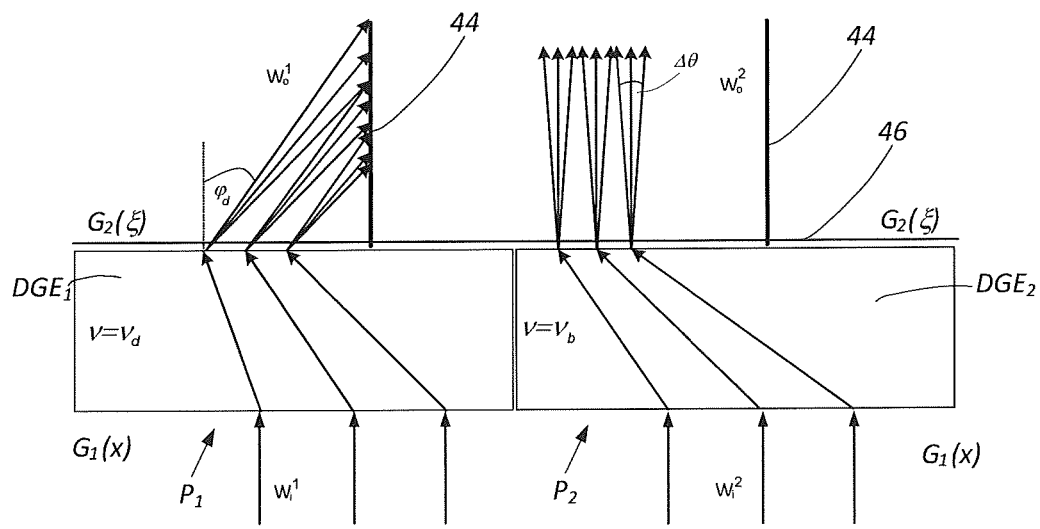
Figure 12:
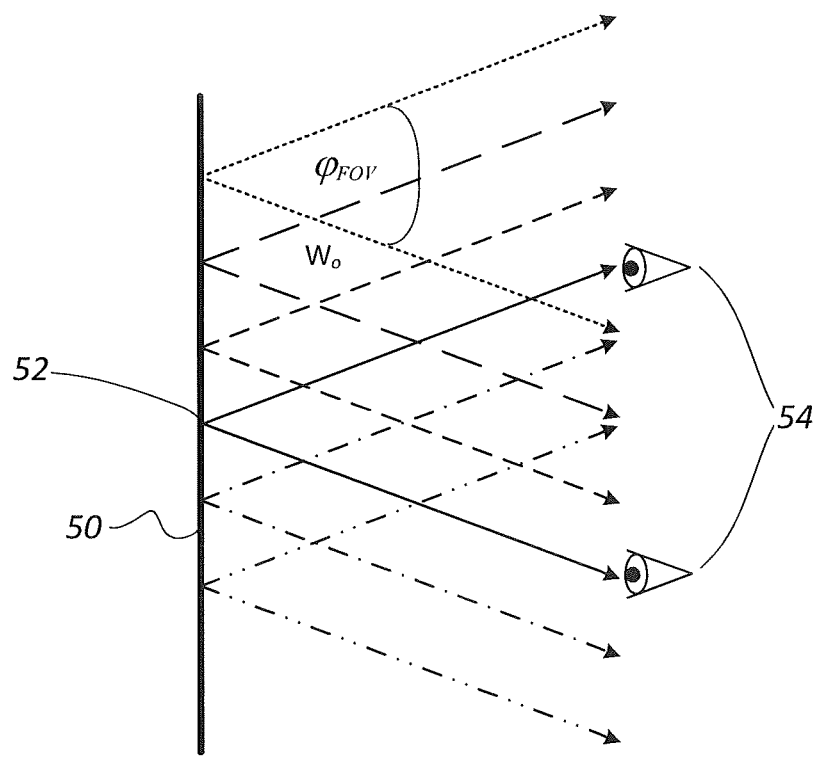
Figure 13:
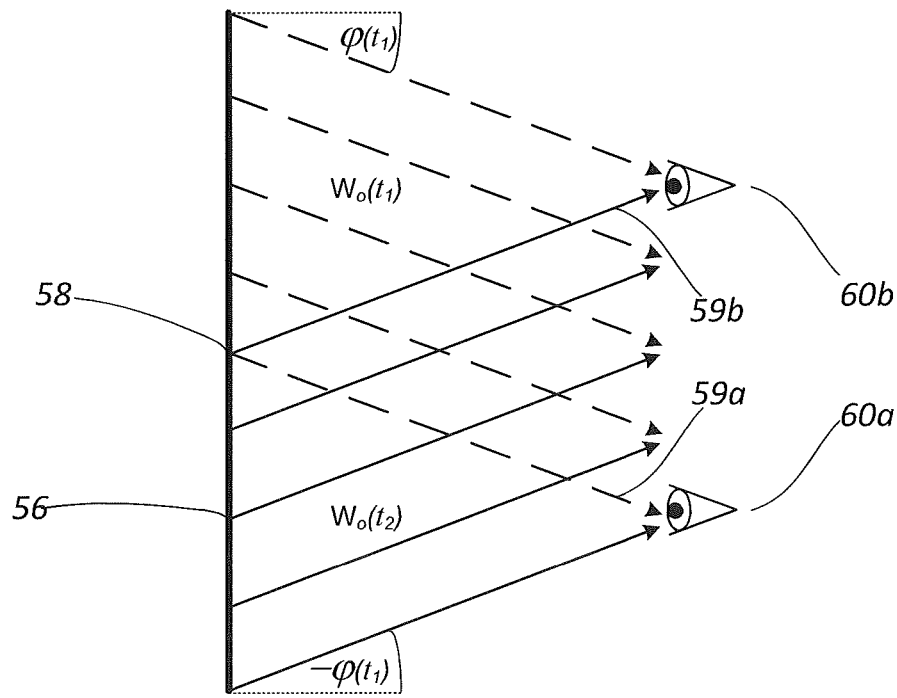
Figure 14:
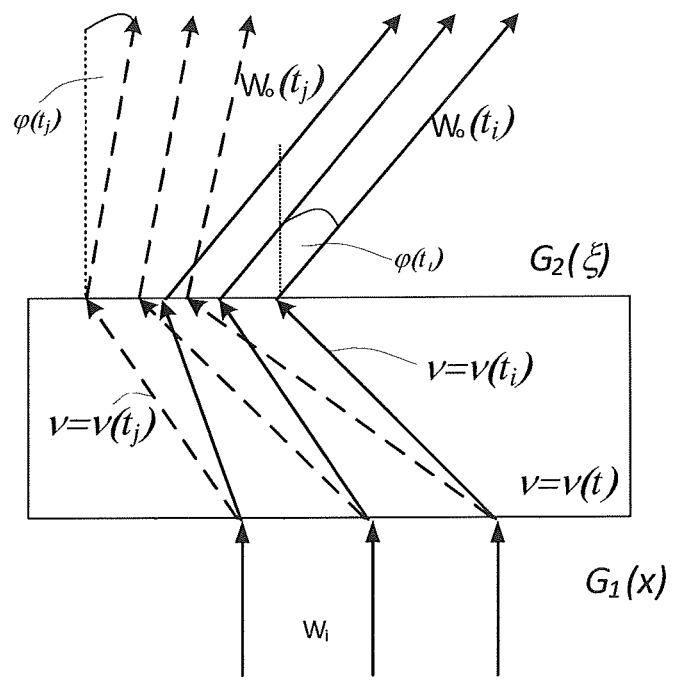
Figure 15:
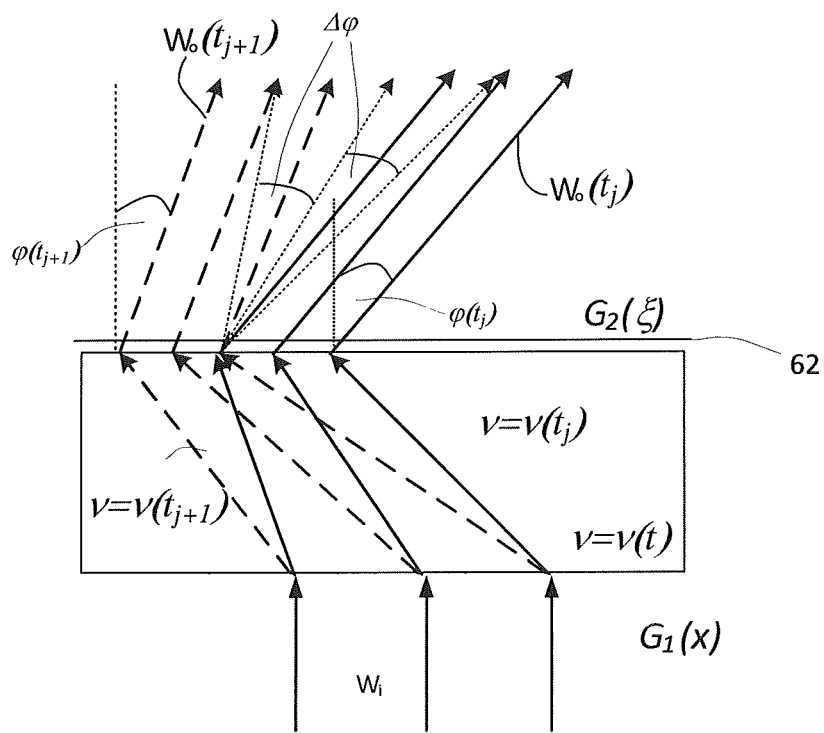
Figure 16A:
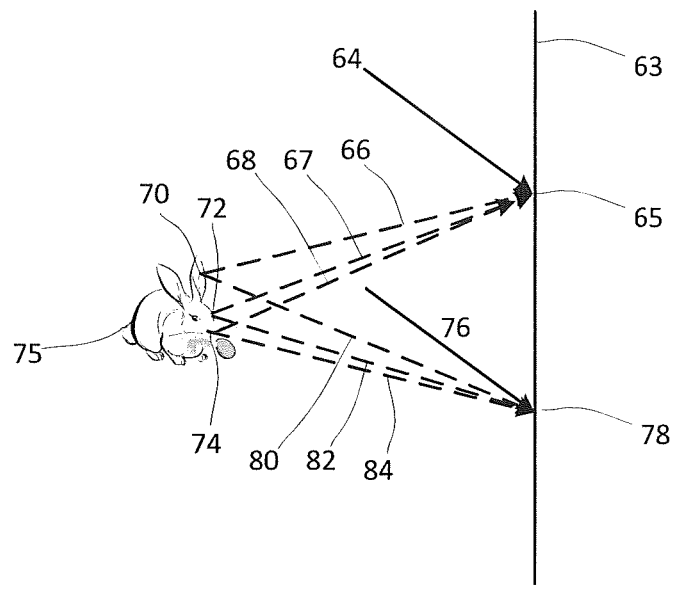
Figure 16B:
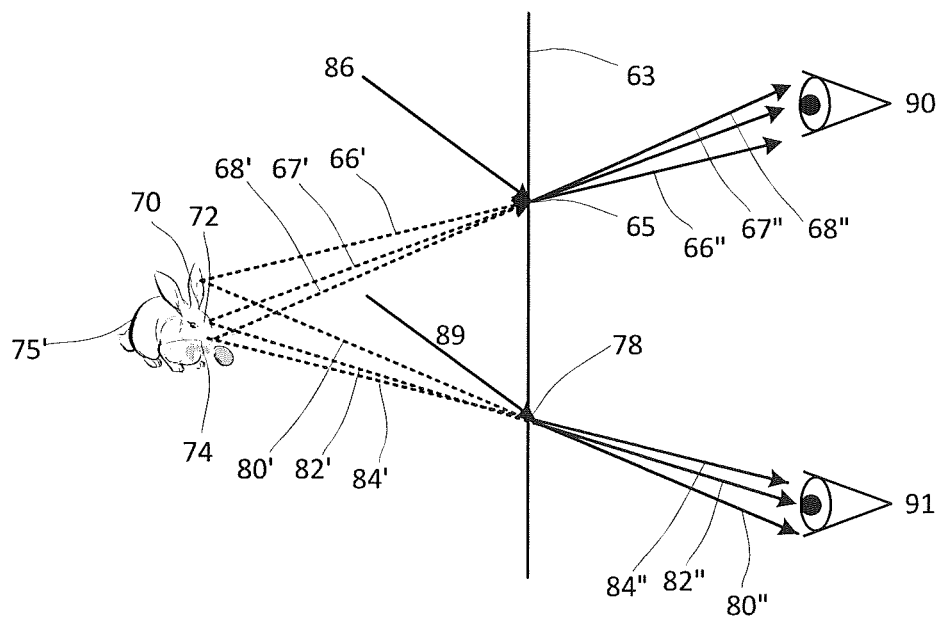
Figure 17:
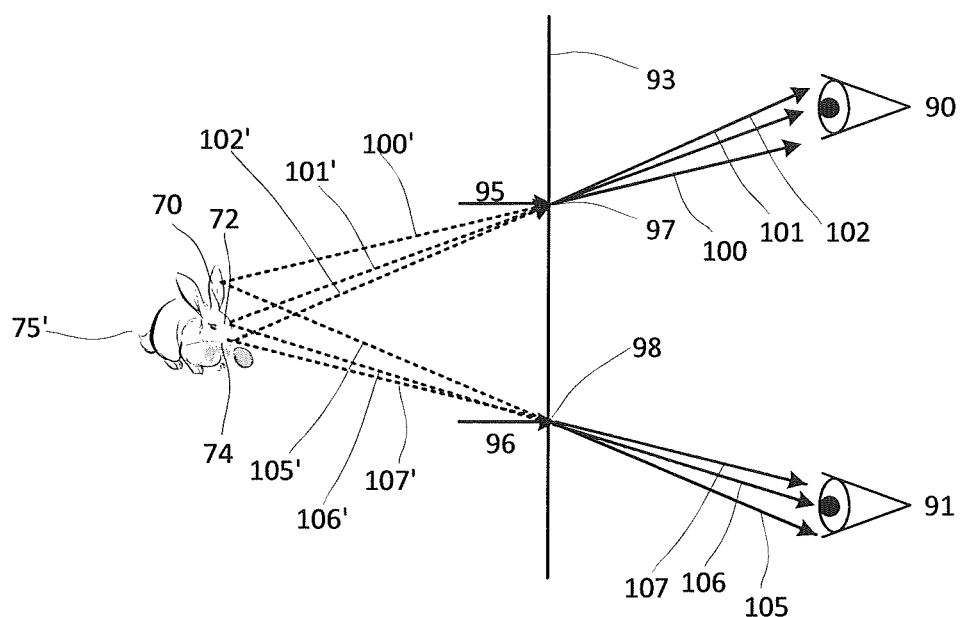
Figure 18A:
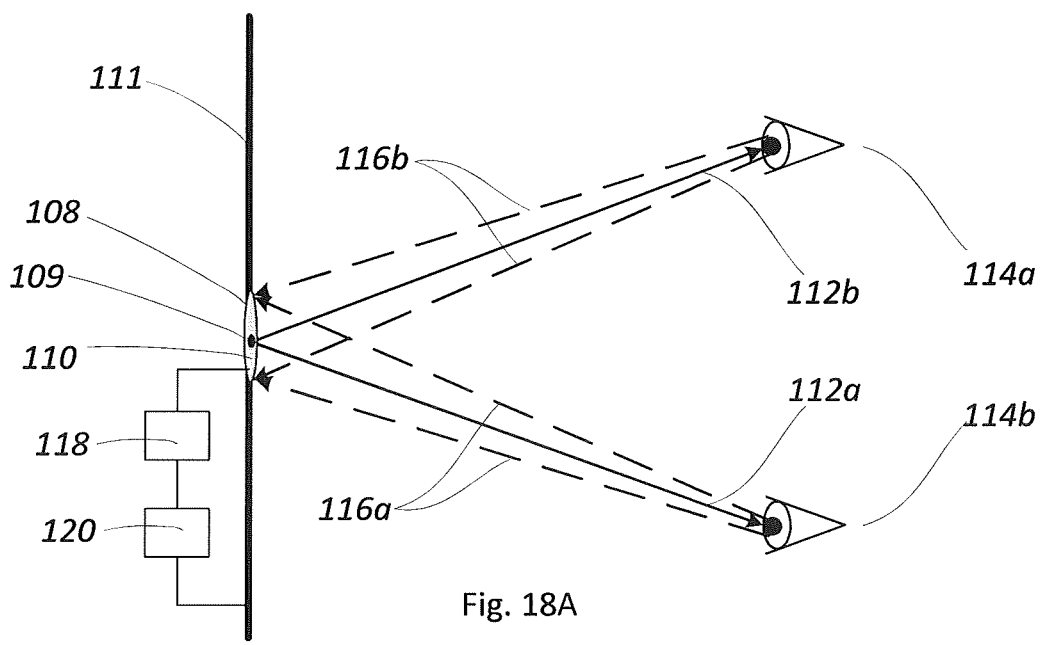
Figure 18B:
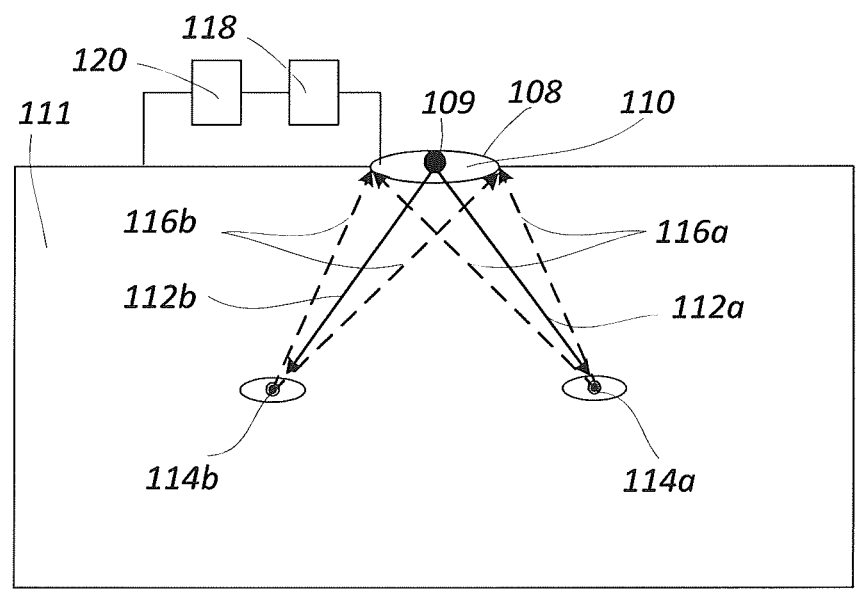
Figure 19:
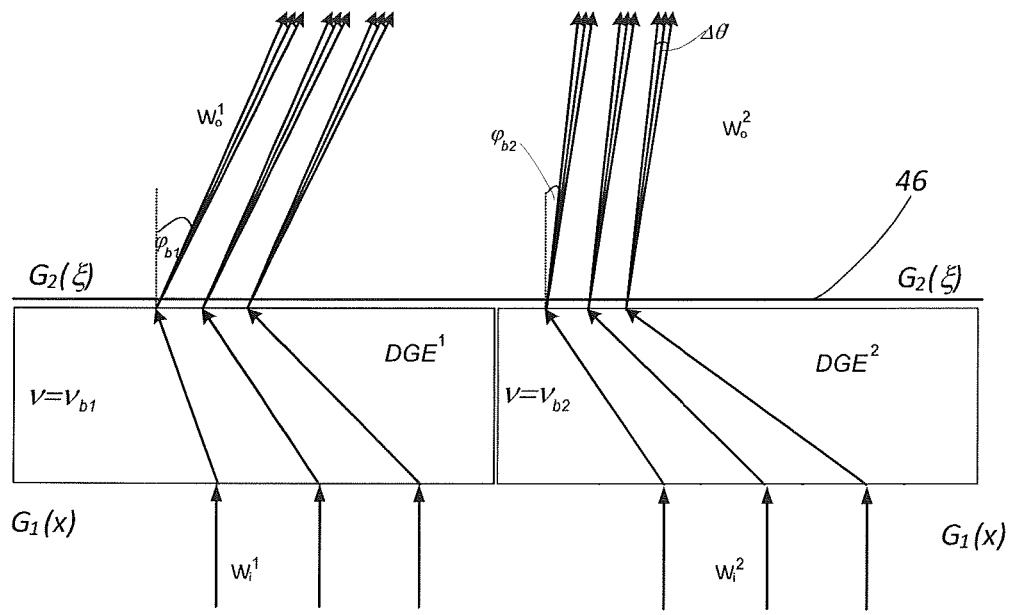
Figure 20:
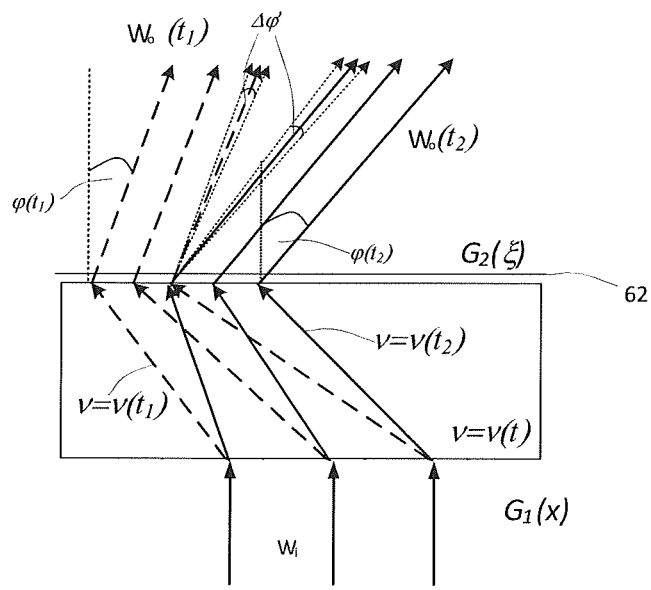
Figure 21A:
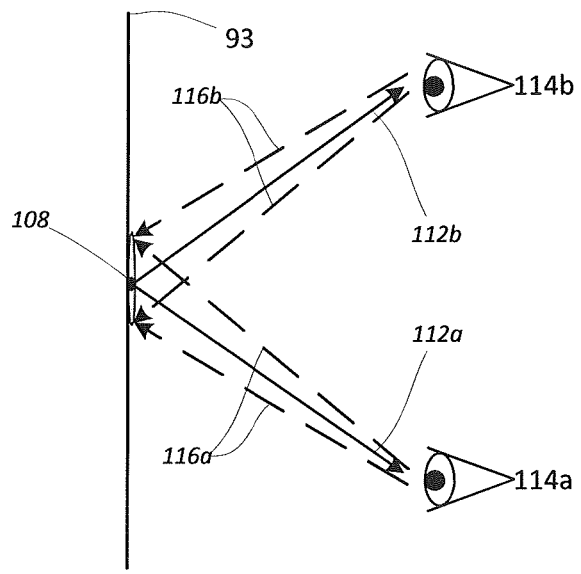
Figure 21B:
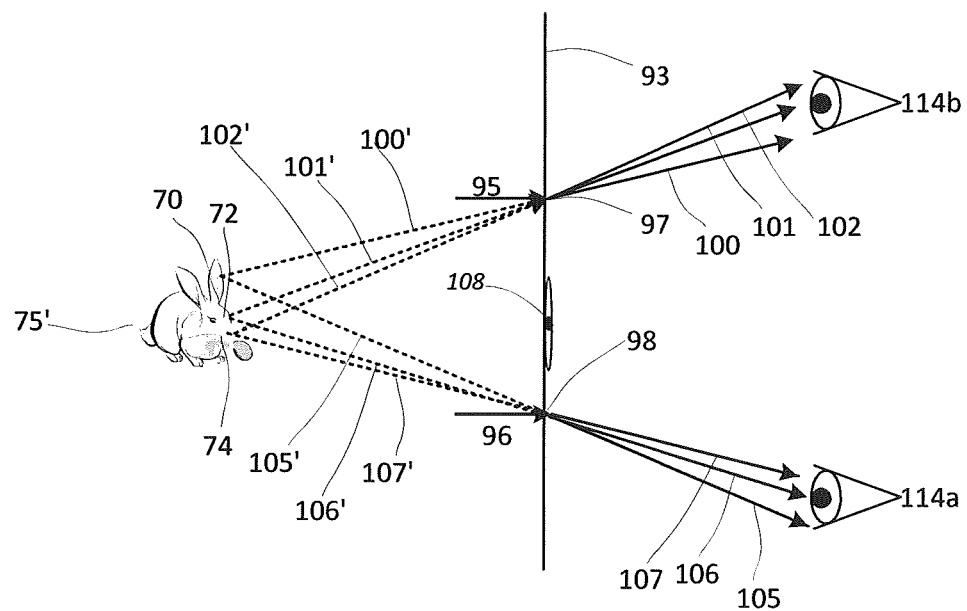

FIGS. 3A, and 3B are diagrams illustrating yet another arrangement of a double grating element, wherein a third, rotatable grating is positioned next to one of the gratings, in accordance with the present invention;

FIG. 4 is diagram illustrating an array of double grating elements, in accordance with the present invention;

FIGS. 5A and 5B are diagrams illustrating an array of double grating elements capable of performing two-dimensional scanning of output beams, in accordance with the present invention;

FIGS. 6A, and 6B are diagrams illustrating yet another arrangement of a double grating element having rotational symmetry capable of performing two-dimensional scanning of an output beam, in accordance with the present invention;

FIG. 7 is a diagram schematically illustrating a side view of a double grating element having rotational symmetry, in accordance with the present invention;

FIGS. 8A, 8B and 8C are diagrams illustrating an arrangement of a double grating element, for separating an input light waves into three laterally displaced output light waves having three different colors, in accordance with the present invention;

FIGS. 9A and 9B are diagrams illustrating a double grating element illuminating (a) a pixel of Liquid Crystal Display and (b) a pixel of a Liquid Crystal on Silicone, in accordance with the present invention;

FIGS. 10A, 10B and 10C are diagrams illustrating double grating elements illuminating pixels of a Liquid Crystal on Silicone, in accordance with the present invention;

FIGS. 11A and 11B are diagrams illustrating an array of double grating elements forming a bi-state dynamic display, in accordance with the present invention;

FIG. 12 is a diagram schematically illustrating a conventional display source;

FIG. 13 is a diagram schematically illustrating an array of double grating elements forming a stereoscopic display, in accordance with the present invention;

FIGS. 14 and 15 are diagrams illustrating an array of double grating elements forming a three-dimensional dynamic display, in accordance with the present invention;

FIGS. 16A and 16B are prior art diagrams illustrating (a) the recording and (b) the reconstructing processes of a holographic display;

FIG. 17 is a diagram schematically illustrating an array of double grating elements forming a full three dimensional display, in accordance with the present invention;

FIGS. 18A and 18B are diagrams schematically illustrating a top view (18A) and front view (18B) of an eyeball tracking unit, comprising an emitter and a detector installed at the central top position of a frame of a display module, in accordance with the present invention;

FIG. 19 is a diagram illustrating an array of double grating elements forming a multi-state dynamic display, wherein the emitted light waves are deviated into the viewer's eyes, in accordance with the present invention;

FIG. 20 is a diagram illustrating an array of double grating elements forming a three-dimensional dynamic display which simultaneously projects different images to different viewers, in accordance with the present invention, and FIGS. 21A and 21B are diagrams schematically illustrating an array of double grating elements forming a full three dimensional display, wherein an eyeball tracking unit is located on the frame of the display and measures the position and gaze direction of the viewer's eyes, in accordance with the present invention.

DETAILED DESCRIPTION

There are many types of display systems currently being utilized in the consumer market, as well as in the professional and military markets. Usually, all of these display systems are composed of a two-dimensional array of pixels, wherein each pixel emits a sequence of diverging light waves, where the amplitude and the color of each diverging light wave is determined by an electronic video signal which is fed into the control module of the display. The object of the present invention is to devise a new family of display systems, wherein the output from each pixel is not a diverging wave, as in conventional displays, but rather a directional light wave, wherein not only the color and the amplitude are controlled by the video signal, but also the direction of the output light wave. That is to say, the video signal which is fed into the display contains not only information about the color and the amplitude that each pixel should emit at each time frame, but also the direction of the light wave which is emitted from each pixel. Therefore, a special mechanism, which also controls the direction of the output beam from each pixel in the display, is illustrated herein.

Figure 1A:
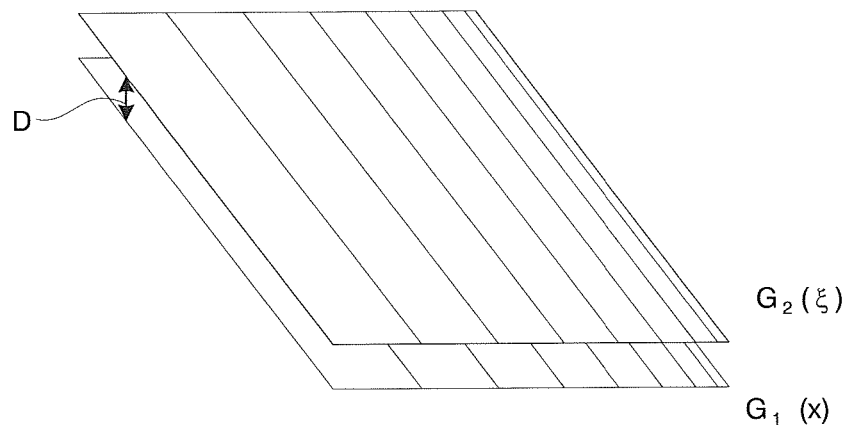
Figure 1B:
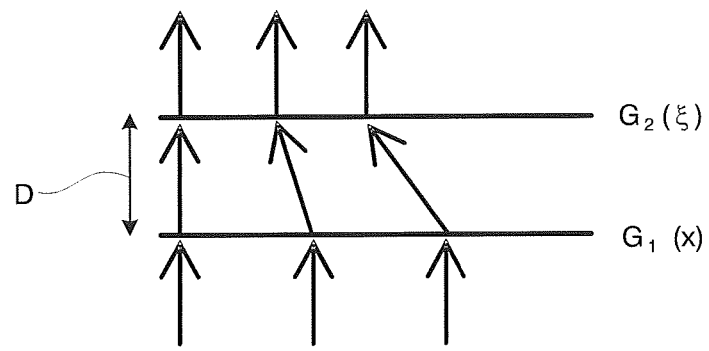
Figure 1C:
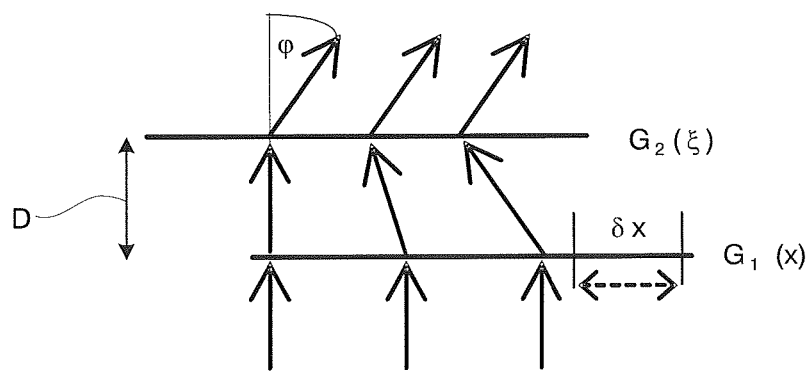

The main building block of the pixels in the present invention is a Double-Grating Element (DGE), comprising a pair of two different gratings located at a constant distance from each other. These gratings have two different predefined chirped grating functions, respectively, namely, there is a lateral variation in the grating period, such that the direction of the light waves illuminating the first grating being diffracted into the second grating and then diffracted out of the DGE, can be electronically controlled by various alternative methods. One approach, shown in FIG. 1A, is based on two parallel gratings, $G_1(x)$ and $G_2(\xi)$, having grating functions $\vec{G_1}(x,y)$ and $\vec{G_2}(\xi,\eta)$, respectively (hereinafter the lateral coordinates of the two gratings $G_1$ and $G_2$ of the DGE will be (x,y) and $(\xi,\eta)$, respectively). The distance D between the gratings is constant, and the input light wave impinging on the first grating, $G_1(x)$, is normal to the grating plane. As shown in FIG. 1B, with no translation of one grating, the output light wave emerges from the second grating, $G_2(\xi)$, in a normal direction to the grating plane. As illustrated in FIG. 1C, however, when $G_1(x)$ is translated in a rightward direction by $\delta x$, the light rays from $G_1(x)$ that intersect with the second gratings $G_2(\xi)$, impinge on points where the grating function is higher than the points that they impinged on before the translation. As a result, the output light wave is deviated by an angle $\varphi$, where the deviation ratio, $k=D(\sin \varphi)/\delta x$, is a constant. Hence, a continuous linear translation of $G_1(x)$ induces a continuous angular steering of the output light wave. The detailed calculation of the required grating functions $\vec{G_1}(x,y)$ and $\vec{G_2}(\xi,\eta)$, fulfilling the requirement that the deviation angle ($\varphi$, for a given translation $\delta x$, will be a constant over the entire surface of the DGE, and can be found in the references quoted above. One of the main advantages of this approach is that a very large deviation coefficient can be attained with this DGE, so that, for example, with a minute linear translation of a few tenths of a micron, it is possible to significantly change the direction of the output beam. As a result, the translation of the grating can be accomplished with a small piezo-electric crystal, and there is no need for a complicated translating or rotating mechanism.

Figure 2A:
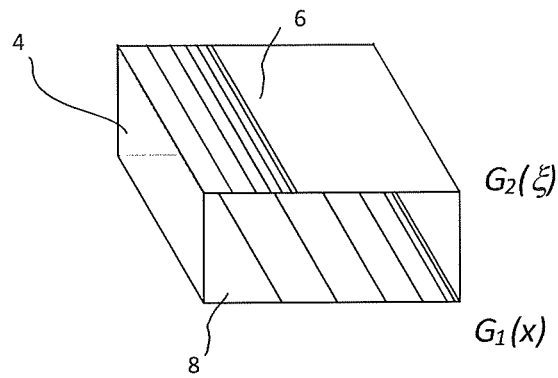
Figure 2B:
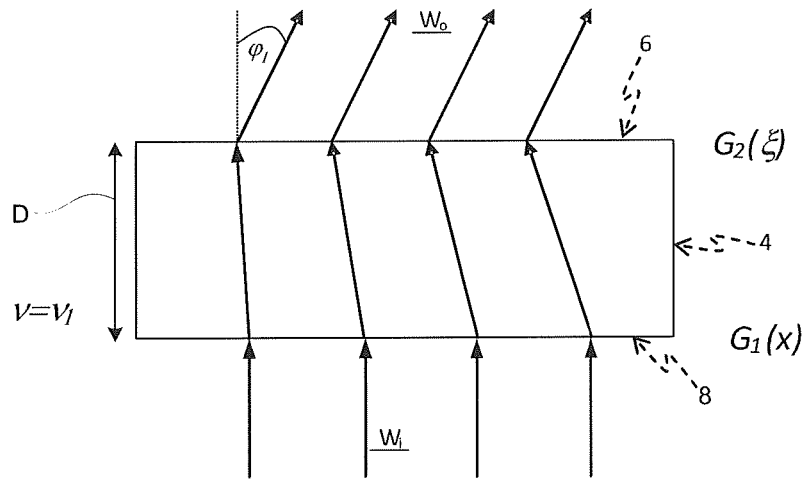
Figure 2C:
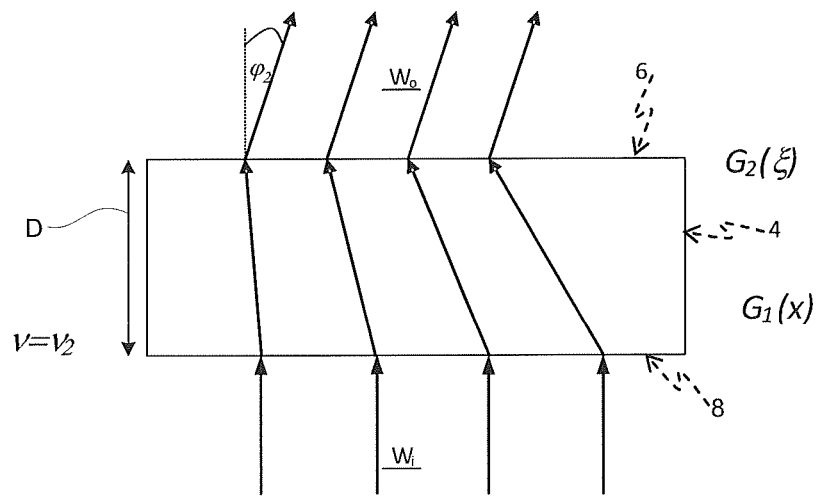

An alternative method for controlling the direction of the output light wave is illustrated in FIGS. 2A, 2B and 2C. As shown in FIG. 2A, the two gratings $G_1(x)$ and $G_2(\xi)$ are formed on a light-transmitting substrate on the two parallel surfaces 6 and 8, respectively, of a light-transmitting substrate 4. A monochromatic plane wave W is coupled inside the substrate by the first grating $G_1(x)$, and thereafter, coupled out by the second grating $G_2(\xi)$. The refractive index of the substrate can be dynamically controlled by external means, including, but not limited to, applying an electric field to the substrate, or by illumination with a strong short-wavelength light source. As illustrated in FIGS. 2B and 2C, a change in the refractive index of the substrate yields an angular deviation of the output light wave, namely, when the refractive index is $v_1$, the output light wave $W_o$ emerges from the second grating $G_2(\xi)$ at an angle $\varphi_1$ with respect to the substrate plane (FIG. 2B). When the refractive index is, however, changed to $v_2$ (wherein $v_2 < v_1$), the rays that are diffracted from the first grating $G_1(x)$ into the second grating $G_2(\xi)$ at higher diffraction angles, due to the decrease in the refractive index of the substrate (FIG. 2C). As a result, the light rays from $G_1(x)$ that intersect with the second gratings $G_2(\xi)$ now impinge on points where the grating function is lower than the points they impinged on before modifying the refractive index. Consequently, the output light wave $W_o$ is deviated by an angle $\Delta\varphi$, namely, the output light wave emerges from grating $G_2(\xi)$ at a different angle $\varphi_2 = \varphi_1 - \Delta\varphi$ to the substrate plane (FIG. 2C), where $\Delta\varphi$ is the deviation angle. Hence, a continuous change in the refractive index induces a continuous angular steering of the output light wave. The detailed calculation of the required grating functions $\vec{G}_1(x,y)$ and $\vec{G}_2(\xi,\eta)$, fulfilling the requirement that the deviation angle $\Delta\varphi$ for a given refractive index modification $\Delta v$ will be a constant over the entire surface of the DGE, can be found in the references quoted above.

An alternative method, not described in the prior art, for achieving the required angular steering of an output beam using a DGE, is illustrated in FIG. 3. A grating $G_0$, having at least one major axis, is positioned in front of the first grating $G_1(x)$ wherein, as illustrated in FIG. 3A, at the default position, the two gratings are parallel to each other and the input light wave $W_i$ impinges on $G_0$ at an incident angle $-\theta$ (hereinafter, rotation angles counterclockwise and clockwise will be denoted as positive and negative angles, respectively). The direction of the image light wave that is diffracted from $G_0$ is:

$$\sin \alpha_i^0 = \lambda G_{0x} - \sin\theta, \tag{1}$$

where, $G_{0x}$ is the x-component of $\vec{G}_0(x,y,z)$, the reciprocal grating function of the grating $G_0$, the super script 0 denotes that the image angle $\sin \alpha_i^0$ is related to the grating $G_0$ and $\lambda$ is the wavelength of the light wave. It is assumed that the grating function of $G_0$ is $$\vec{G}_0(x,y,z) = \left(\frac{\sin\theta}{\lambda}, 0, 0\right), \tag{2}$$

namely, $G_0$ is a linear grating having a constant lines period along the x axis. Inserting Eq. (2) into Eq. (1) yields $$\sin \alpha_i^0 = 0. \tag{3}$$

That is, the image light wave is normal to the grating plane. Assuming now that the grating $G_0$ is rotated counterclockwise around the y-axis by an angle $\delta$, the reconstructing angle of the incoming light wave compared to the rotated grating is:

$$\sin \alpha'^0_c(\delta) = \sin(-\theta - \delta). \tag{4}$$

The output angle of the image wave is:

$$\sin \alpha'^0_i(\delta) = \lambda G_{0x} + \sin \alpha'^0_c(\delta) = \sin\theta - \sin\theta \cos\delta - \sin\delta \cos\theta. \tag{5}$$

For small rotation angle $\delta$, the output angle is $$\sin \alpha'^0_i(\delta) \approx -\delta \cos\theta. \tag{6}$$

Compared with the original plane of grating $G_0$, the output angle is:

$$\sin \alpha_i^0(\delta) \approx \delta - \delta \cos\theta = \delta(1 - \cos\theta). \tag{7}$$

As illustrated in FIG. 3B, the image light wave of $G_0$ is the input light waves to the grating $G_1(x)$, that is:

$$\sin \alpha_c^1(\delta) = \sin \alpha_i^0(\delta) \approx \delta(1 - \cos\theta). \tag{8}$$

Assuming that the two gratings $G_1(x)$ and $G_2(\xi)$ also have a non-zero component only along the x axis, then $$\sin \alpha_i^1(\delta) = \lambda G_1 + \sin \alpha_c^1(\delta) = \sin \alpha_i^1(0) + \delta(1 - \cos\theta). \tag{9}$$

Hereinafter, the coordinates of the gratings $G_1$ and $G_2$ are denoted as (x,y,z) and ($\xi,\eta,\zeta$), respectively. As illustrated in FIG. 3B, the image ray from $G_1(x)$ "moves" leftward (i.e., in a negative direction) along the x axis of $G_2(\xi)$ as a result of rotating $G_0$ by an angle $\delta$, by a distance $$\Delta\xi = D(\tan \alpha_i^1(\delta) - \tan \alpha_i^1(0)), \tag{10}$$

where, D is the vertical distance between $G_1(x)$ and $G_2(\xi)$. Hence, a ray that emerges from point x on the grating $G_1(x)$ for zero rotation having a direction of $\alpha_i^1(0)$ impinges on the grating $G_2(\xi)$ at a point $\xi$, while for a rotation of $\delta$ the ray emerges from the same point x having a direction of $\alpha_i^1(\delta)$ and impinges on the grating $G_2$ at a point $\xi - \Delta\xi$. For small rotating angle $\delta$ $$\tan\alpha_i^1(\delta) - \tan\alpha_i^1(0) \sim \frac{\delta'}{\cos^2\alpha_i^1}. \tag{11}$$

and $$\sin\alpha_i^1(\delta) - \sin\alpha_i^1(0) \sim \delta' \cdot \cos\alpha_i^1, \tag{12}$$

where $\delta' = \alpha_i^1(\delta) - \alpha_i^1(0)$. Therefore $$\tan\alpha_i^1(\delta) - \tan\alpha_i^1(0) \sim \frac{\sin\alpha_i^1(\delta) - \sin\alpha_i^1(0)}{\cos^3\alpha_i^1}. \tag{13}$$

Inserting Eqs. (9) and (13) into Eq. (10) yields $$\Delta\xi = D\left(\frac{\sin\alpha_i^1(\delta) - \sin\alpha_i^1(0)}{\cos^3\alpha_i^1}\right) = \frac{D(\delta(1 - \cos\theta))}{\cos^3\alpha_i^1}. \tag{14}$$

Assuming that the light waves that are diffracted out of the grating $G_2(\xi)$ after a rotation of $G_0$ by an angle of $\delta$, should be deviated by an angle of $\omega$ from the normal to the grating plane, then:

$$\alpha_i^2(\delta) = \varphi, \tag{15}$$

As a result, the grating function at the point $\xi-\Delta\xi$ is:

$$\lambda G_2(\xi - \Delta\xi) = -\sin\alpha_c^2(\delta, \xi - \Delta\xi) + \sin\alpha_i^2(\delta, \xi - \Delta\xi) \quad (16)$$
$$= -\sin\alpha_i^1(\delta) + \sin(\varphi),$$

where, the −1 order is diffracted from grating $G_2$. Inserting Eq. (9) into Eq. (16) yields $$\lambda G_2(\xi - \Delta\xi) = -\sin\alpha_i^1(0) - \delta(1 - \cos\theta) + \sin(\varphi) \quad (17)$$
$$= -\lambda G_1(x) - \delta(1 - \cos\theta) + \sin(\varphi) \equiv -\lambda G_1(x) + \sigma \cdot \delta$$

where $\sigma \equiv -(1-\cos\theta)+\sin(\varphi)/\delta$ is defined as the "angular amplification factor" of the DGE. $\sigma$ is not dependent on x or $\xi$., and thus, $\sigma$ is a constant over the entire surfaces of the gratings. For $\delta=0$ the input light waves to $G_1(x)$ and the output light waves from $G_2(\xi)$ are plane waves normal to the grating planes. As illustrated in FIG. 3A for $\delta=0$ the light ray is traced from the point x on $G_1(x)$ to the point $\xi$ on $G_2(\xi)$. Therefore, $$\lambda G_2(\xi) = -\lambda G_1(x) = -\sin\alpha_i^1(0). \quad (18)$$

Combining Eqs. (17) and (18) yields:

$$\lambda G_2(\xi-\Delta\xi)-\lambda G_2(\xi)=\lambda G_2(\xi-\Delta\xi)+\lambda G_1(x)=\sigma\cdot\delta. \quad (19)$$

Dividing Eq. (19) by eq. (14) yields:

$$\frac{\lambda G_2(\xi-\Delta\xi)-\lambda G_2(\xi)}{-\Delta\xi} = \frac{\sigma\cdot\delta}{\frac{D(\delta(1-\cos\theta))}{\cos^3\alpha_i^1}} = b\cdot\cos^3\alpha_i^1, \quad (20)$$

where, $$b = \frac{\sigma}{D(1-\cos\theta)}$$

is a constant. For small $\delta$ the following approximation may be written $$\frac{d\lambda G_2(\xi)}{d\xi} = -b\cdot\cos^3\alpha_i^1, \quad (21)$$

Inserting Eq. (18) into Eq. (20) yields:

$$\frac{d\sin\alpha_i^1}{\cos^3\alpha_i^1} = bd\xi, \quad (22)$$

The solution of this equation is:

$$\tan\alpha_i^1(x) = \tan\alpha_c^2(\xi) = b\cdot\xi, \quad (23)$$

or $$\frac{\lambda G_2(\xi)}{\sqrt{1-(\lambda G_2(\xi))^2}} = b\cdot\xi. \quad (24)$$

Where the boundary condition of $\lambda\, G_2(\xi)=0$ for $\xi=0$ is used, the solution of this equation is:

$$\lambda G_2(\xi) = \frac{b\cdot\xi}{\sqrt{1+(b\cdot\xi)^2}}. \quad (25)$$

As illustrated in FIG. 3A, for $\delta=0$ $$x(\xi)=\xi+D\tan\alpha_i^1(x)=\xi+D\tan\alpha_c^2(\xi). \quad (26)$$

Inserting Eq. (23) into Eq. (26) yields $$x(\xi) = \frac{1+b\cdot D}{b}\cdot\tan\alpha_i^1(x) = \frac{1+b\cdot D}{b}\cdot\frac{\lambda G_1(x)}{\sqrt{1-(\lambda G_1(x))^2}}. \quad (27)$$

The solution of this equation is $$\lambda G_1(x) = \frac{c\cdot x}{\sqrt{1+(c\cdot x)^2}}, \quad (28)$$

where the constant c is defined as $$c \equiv \frac{b}{1+b\cdot D}.$$

Since $\sigma$, the angular amplification factor of the DGE, is a constant over the entire surfaces of the gratings, the deviation angle $\varphi$, for a given rotation g of the grating $G_0$, will be a constant for the entire DGE. Hence, a continuous change in rotation angle of the grating $G_0$ induces a continuous angular steering of the output light wave from the grating $G_2(\xi)$, which is significantly amplified by the DGE in relation to the angular rotation of output wave from the grating $G_0$.

It is important to note that the solution given in Equations (25) and (28) is not the most accurate analytical one, but rather an approximate solution, illustrating the capability of finding an easy and fast analytical solution for the embodiment illustrated in FIGS. 3A and 3B. For most cases, however, this solution is accurate enough and enables a simple realization of a display system where for each pixel, a small rotation of the grating $G_0$ can be significantly amplified by a DGE. In addition, the embodiment of FIGS. 3A and 3B can be used not only for a pixelated display source, but also for other systems where a single light beam can be steered using a rotating grating and an amplifying DGE.

In this context, a few alternatives for achieving the required angular steering of an output beam using a single DGE were illustrated in FIGS. 1-3. It is clear, however, that more than a single element is required, in order to achieve a display whose operation is based on the principle of manipulating light waves utilizing DGEs.

FIG. 4 illustrates an array of two different DGEs, which are located adjacent to each other, and can be controlled separately. Naturally, many more than two pixels are necessary to facilitate a display and usually a two dimensional array of pixels is required. FIG. 4 (and the Figures following same) is just an illustration as to how two different DGEs may be utilized to form two pixels that are capable of emitting two different light waves as part of a whole display. As shown, two different DGEs, DGE[1] and DGE[2] are juxtaposed. (Hereinafter, for systems having a multiple number of DGEs, the superscript will denote the ordinal number of a specific pixel). The structures of the two DGEs are identical, i.e., the refractive index of the two substrates, which are located between the two DGEs respectively, can be controlled separately by applying two different electric currents on the substrates of the pixels. As seen in FIG. 4, two different refractive indices $v^1 \neq v^2$ are set for the two DGEs, and therefore, the two image light waves emerging from the DGEs are diffracted into two different directions, $\varphi^1 \neq \varphi^2$. For a dynamic display, the controlling currents can be modified continuously, and therefore, the output directions of the light waves emerging from the pixels can be controlled accordingly. In this embodiment, the approach using the electronically controllable refractive index is illustrated, however, other approaches such as those illustrated in FIGS. 1 and 3, or any other method that uses DGEs, may be utilized.

The beam steering illustrated in FIGS. 1-4 is performed only in the x axis. A two-dimensional deviation for each pixel, however, can easily be materialized by combining two different parallel DGEs for each pixel, whereby the scanning direction of each DGE is normal to that of the other. FIGS. 5A and 5B illustrate a system in which two pixels are positioned adjacent to each other. Each pixel is composed of two DGEs oriented normal to each other. For each pixel, in addition to the DGE $D_x^i$ having the gratings $G_1^i(x)$, $G_2^i(\xi)$ (i=1,2) in which the grating functions depend only on the x axis, a second DGE $D_y^i$, having the gratings $H_1^i(y)$, $H_2^i(\eta)$ (i=1,2) in which the grating functions depend only on the y axis, which is orthogonal to the x axis, is positioned on top of the DGE $D_x^i$. As illustrated in FIG. 5A, the light waves first pass through $D_x^i$ and are rotated accordingly around the y axis by an angle $\varphi_x^i$, which is set by controlling the refractive index $v_x^i$ of the first DGE $D_x^i$. The light waves then pass through the second DGE $D_y^i$, wherein the rotation around the y axis is not influenced by the DGE. As illustrated in FIG. 5B, the rotation around the x axis is not influenced when the light waves pass through the first DGE $D_x^i$. The light waves then pass through the second DGE $D_y^i$ and are rotated accordingly around the x axis by an angle $\varphi_y^i$, which is set by controlling the refractive index $v_y^i$ of the second DGE $D_y^i$. Since the refractive indices of the two orthogonal DGEs, belonging to the same pixel can be controlled separately, the exact two dimensional deviation of the output angle $\varphi_x^i$, $\varphi_y^i$ can be set by the control system.

In the system illustrated in FIGS. 5A and 5B, the two vertically adjacent gratings in each pixel, $G_2^i(\xi)$ and $H_1^i(y)$, are fabricated separately. There are systems however, where it is simpler to combine these two grating together to form a unified grating $GH^i(\xi, y)$ having the grating function which is the combination of these two gratings, namely:

$$\vec{GH^i}(\xi,y) = \vec{G_2^i}(\xi) + \vec{H_1^i}(y). \tag{29}$$

There are some opposing considerations for the manner in which the structure of a two DGEs pixel can be fabricated. On the one hand, from the point of view of a simple assembly process, it is preferable to unify the two adjacent gratings as described above. On the other hand, it is usually much simpler to separately fabricate a one dimensional grating, such as $G_2^i(\xi)$ or $H_1^i(y)$ than it is to fabricate the two-dimensional grating $GH^i(\xi,y)$, which can sometimes have a complicated grating function. Therefore, the specific fabrication method for each system can be determined according to the detailed parameters of each system.

Another approach for achieving the required two-dimensional scanning, which differs from that described in FIGS. 5A and 5B, is to utilize a single DGE instead of two adjacent orthogonal DGEs, wherein each grating has a two dimensional grating function depending on the x, as well as the y coordinates. The system should contain a dynamic control unit, which will be capable of setting the deviation angle around the two axes. One possibility is to modify the optical system illustrated in FIG. 2 by using a substrate having a dynamic birefringent material in which the refractive index can be controlled separately along two orthogonal axes. Another method is to modify the system illustrated in FIG. 3 by using a grating $G_0$, which can be rotated around the x, as well as the y axes.

A different method, based on the optical system shown in FIG. 1, is illustrated in FIGS. 6A and 6B. The reciprocal grating function of the second grating $G_2(\xi,\eta,\zeta)$ is defined as:

$$\vec{G_2}(\xi, \eta, \zeta) = \left(\frac{1}{d_\xi}, \frac{1}{d_\eta}, \frac{1}{d_\zeta}\right), \tag{30}$$

where, $(d_\xi, d_\eta, d_\zeta)$ are the distances between two adjacent grating lines at a given point $(\xi, \eta, \zeta)$ along the $(\vec{\xi}, \vec{\eta}, \vec{\zeta})$ axes, respectively. Since the grating plane is normal to the $\vec{\zeta}$ axis, the grating function can be written as:

$$\vec{G_2}(\xi, \eta) = \left(\frac{1}{d_\xi}, \frac{1}{d_\eta}\right). \tag{31}$$

Assuming that the grating function of the grating $G_2$ has a radial symmetry, it can be written that $G_2(\xi,\eta)=G_2(\rho)$, wherein $\rho=\sqrt{\xi^2+\eta^2}$ is the radial distance between a given point $(\xi,\eta)$ and the center of the grating and wherein $d_\rho$, the radial distance between two adjacent grating lines at a given point$(\xi,\eta)$ is given by the equation $$\frac{1}{d_\rho} = \sqrt{\left(\frac{1}{d_\xi}\right)^2 + \left(\frac{1}{d_\eta}\right)^2}.$$

A grating $G_2$ having the grating function of the form:

$$\vec{G_2}(\rho) = -\left(\frac{\rho}{\Lambda}\right)\vec{\rho}, \tag{32}$$

is chosen,
wherein, $\Lambda$ is a constant, the minus sign denotes that the $-1$ order of the grating $G_2$ is utilized and $\vec{\rho}$ is the radial unit vector. The grating function is linearly monotonic increasing as a function of the radius $\rho$. In that case, the various components of the gratings $G_2$ are:

$$G_{2\rho}(\rho) = -\left(\frac{\rho}{\Lambda}\right) \tag{33}$$

$$G_{2\xi}(\xi) = -\left(\frac{\xi}{\Lambda}\right)$$

$$G_{2\eta}(\eta) = -\left(\frac{\eta}{\Lambda}\right).$$

The diffraction equation from a grating is given by:

$$\vec{V_i} = +\lambda\vec{G_2} + \vec{V_c}, \tag{34}$$

wherein, $\vec{V_i}$ and $\vec{V_c}$ are the vectors of the image and the reconstructing light waves, respectively. The components of these vectors can be written as:

$$k_i = \lambda G_{2\rho} + k_c.$$

$$l_i = \lambda G_{2\xi} + l_c$$

$$m_i = \lambda G_{2\eta} + m_c, \quad (35)$$

wherein, $\lambda$ is the wavelength of the diffracted light waves, k, l and m are the components of the light waves vectors (or the direction cosines) along the $\rho$, $\xi$ and $\eta$ axes, respectively.

As illustrated in FIG. 6A, without loss of generality, it is assumed that image light wave which is diffracted from the grating $G_2$ is a plane wave normal to the grating's plane, that is to say:

$$\vec{V}_i = k_i = l_i = m_i = 0. \quad (36)$$

As a result, the direction cosines of the reconstructing wave $\vec{V}_c$ should be:

$$k_c = -\lambda G_{2\rho} = \left(\frac{\lambda \rho}{\Lambda}\right) \quad (37)$$

$$l_c = -\lambda G_{2\xi} = \left(\frac{\lambda \xi}{\Lambda}\right)$$

$$m_c = -\lambda G_{2\eta} = \left(\frac{\lambda \eta}{\Lambda}\right).$$

As illustrated in FIG. 6B, the grating is now translated by $\Delta\rho$, wherein $\Delta\rho = \sqrt{\Delta\xi^2 + \Delta\eta^2}$. Therefore, a point $(\xi, \eta)$ at the surface of the second grating $G_2$ is now positioned compared to the first grating $G_1$, at the same location where the point $(\xi+\Delta\xi, \eta+\Delta\eta)$ was positioned before the translation. As a result, the point $(\xi, \eta)$ at the surface of the second grating $G_2$, is illuminated after the translation by a readout ray having the direction cosines of:

$$k_c^{\Delta\rho} = \left(\frac{\lambda(\rho+\Delta\rho)}{\Lambda}\right) = \left(\frac{\lambda\rho}{\Lambda} + \frac{\lambda\Delta\rho}{\Lambda}\right) \quad (38)$$

$$k_c^{\Delta\xi} = \left(\frac{\lambda(\xi+\Delta\xi)}{\Lambda}\right) = \left(\frac{\lambda\xi}{\Lambda} + \frac{\lambda\Delta\xi}{\Lambda}\right)$$

$$k_c^{\Delta\eta} = \left(\frac{\lambda(\eta+\Delta\eta)}{\Lambda}\right) = \left(\frac{\lambda\eta}{\Lambda} + \frac{\lambda\Delta\eta}{\Lambda}\right).$$

Inserting Eqs. (33) and (38) into Eq. (34) yields:

$$k_i^{\Delta\rho} = \lambda G_{2\rho} + k_c^{\Delta\rho} = -\frac{\lambda\rho}{\Lambda} + \left(\frac{\lambda\rho}{\Lambda} + \frac{\lambda\Delta\rho}{\Lambda}\right) = \frac{\lambda\Delta\rho}{\Lambda} \quad (39)$$

$$l_i^{\Delta\xi} = \lambda G_{2\xi} + l_c^{\Delta\xi} = -\frac{\lambda\xi}{\Lambda} + \left(\frac{\lambda\xi}{\Lambda} + \frac{\lambda\Delta\xi}{\Lambda}\right) = \frac{\lambda\Delta\xi}{\Lambda}$$

$$m_i^{\Delta\eta} = \lambda G_{2\eta} + m_c^{\Delta\eta} = -\frac{\lambda\eta}{\Lambda} + \left(\frac{\lambda\eta}{\Lambda} + \frac{\lambda\Delta\eta}{\Lambda}\right) = \frac{\lambda\Delta\eta}{\Lambda}.$$

The direction of the image ray $\vec{V}_i^{\Delta\rho}(\xi,\eta)$ is invariant to the point $(\xi,\eta)$ at the surface of the second grating $G_2$, meaning that the entire light wave impinging on the surface of the second grating, is diffracted to the same direction, and hence, the image wave is a pure plane wave having the direction cosines of Eq. (39).

In order to calculate the requested grating function $\vec{G}_1(r)$ of the first grating, a ray from a given point $\rho$ on the second grating to the respective point $r(\rho)$ on the first grating can be traced, wherein the two gratings are positioned at the default zero position, i.e., wherein $\Delta\rho=0$.

As illustrated in FIG. 7, the lateral distance along the radial axis between $\rho$ and $r(\rho)$ is given by:

$$r(\rho) = \rho + D \cdot \tan(\beta), \quad (40)$$

wherein, D is the distance between the two gratings and the direction cosine of the ray which is traced from $r(\rho)$ to $\rho$ is:

$$k_c(\rho) = k_i(r) = \sin(\beta). \quad (41)$$

Inserting Eq. (37) into (41) yields $$\sin(\beta) = \left(\frac{\lambda\rho}{\Lambda}\right). \quad (42)$$

Inserting Eq. (42) into (40) yields $$r(\rho) = \frac{\Lambda \sin(\beta)}{\lambda} + d \cdot \tan(\beta). \quad (43)$$

It is assumed that without loss of generality, the readout light wave which illuminates the first grating $G_1$ is a plane wave normal to the grating's plane, namely, that $k_c(r)=0$.

As a result, the grating function $\vec{G}_1(r)$ of the first grating is:

$$\vec{G}_1(r) = \frac{k_i(r)}{\lambda}\vec{r} = \frac{\sin(\beta)}{\lambda}\vec{r}, \quad (44)$$

wherein $\vec{r}$ is the radial unit vector. Therefore, the absolute value of the grating $\vec{G}_1(r)$ is:

$$G_1(r) = \frac{k_i(r)}{\lambda} = \frac{\sin(\beta)}{\lambda}, \quad (45)$$

or $$\sin(\beta) = \lambda G_1(r). \quad (46)$$

Inserting Eq. (46) into (43) yields $$r(\rho) = \Lambda G_1(r) + \frac{d \cdot G_1(r)}{\sqrt{1 - \lambda^2 G_1^2(r)}}. \quad (47)$$

This is a simple monotonic increasing function, and therefore, the inverse function $G_1(r)$ can easily be found. The direction cosine must fulfil the condition:

$$k_c(\rho) = \frac{\lambda\rho}{\Lambda} = \sin(\beta) \leq 1. \quad (48)$$

Therefore, the maximal radial distance from the center of the grating $G_2$ is:

$$\rho_{max} \leq \frac{\Lambda}{\lambda}. \quad (49)$$

Utilizing Eq. (39) yields:

$$\frac{\lambda}{\Lambda} = \frac{k_i^{\Delta\rho}}{\Delta\rho} \leq \frac{1}{\rho_{max}}. \quad (50)$$

As a result, the maximal angular deviation that can be obtained from the double grating assembly illustrated in FIGS. 6A, 6B and 7 is $$k_i^{\Delta\rho} \leq \frac{\Delta\rho}{\rho_{max}}. \tag{51}$$

In all of the systems illustrated in FIGS. 1-6, it was assumed that the displays are illuminated by monochromatic light waves having a single wavelength λ. In almost all of the illustrated display systems, however, the display should have the capability of projecting full color images. One approach for achieving a colorful display, especially for applications where the picture element size is comparatively large, is to utilize a Fresnel element instead of diffraction gratings, cylindrical for the embodiments of FIGS. 1-5, and circular elements for the embodiment of FIGS. 6A and 6B, as the basic elements for the picture elements. In that case, it is possible to design the Fresnel elements such that they will obey Eqs. (1)-(51), and in addition, their sensitivity to the reconstructing wavelength will be much lower and a white light can be used to illuminate them. For diffractive gratings, however, the sensitivity to the reconstructing wavelength is very high, and each picture element has to be reconstructed with a monochromatic light. Therefore, at least three different images, having three different colors, respectively, should be multiplexed together to create the required colorful image. There are two main methods to facilitate the required color multiplexing. One method is the time sequential color imaging, in which the color images are generated by sequentially laying down three basic colors of red, green, and blue (RGB) light in a single image frame, which typically lasts 1/f of a second, where f is the frequency of the system, usually 50 or 60 hertz. This means that the period time frame is divided into three equal sub-periods, wherein in each one, only one color is illuminating the display. It is possible to utilize this method for the present invention by fabricating each one of the grating in the DGE as a multiplexed grating which is composed of three overlapping gratings, each one being sensitive to one of the three basic colors and non-sensitive to the other two colors. The main problem of using this approach to illuminate DGE is that it is usually difficult to achieve high diffraction efficiencies for a multiple grating. As a consequence thereof, there is a risk of a "cross-talk" of the light waves between the three overlapped gratings (that is, a light wave will be diffracted by the "wrong" grating), resulting in the color quality and the contrast of the image being degraded.

An alternative method for achieving a color display is to utilize the color-filter approach. Each pixel in the display is divided into three subpixels wherein the color-filter process adds three basic RGB color dyes or pigments to each subpixel so that by mixing the three primary colors, almost any color can be generated. The main disadvantage of this method is that the display is illuminated by a white light wave, or by a mixing of three different light waves having different RGB colors, respectively. As a result, all of the subpixels are illuminated by the three different light waves, where only one of them, having the appropriate color, passes through the color filter, while the other two light waves having the "wrong" color, are absorbed. Therefore, the transmittance efficiency of color-filter display is reduced by a factor of at least three.

FIGS. 8A-8C illustrate an alternative method for illuminating a display source using an array of DGEs, to achieve a high efficient system. As illustrated in FIG. 8A, an input light wave $W_{rgb}^i$, which is a mix of three plane light waves, $W_r^i$, $W_g^i$ and $W_b^i$, having the colors RGB, respectively, impinges on a DGE $D_{rgb}$ normal to the grating's plane. The first grating $C_{rgb1}(x)$, having a lateral dimension of $a_x$, is a multiplexed grating of three different gratings $C_{r1}(x)$, $C_{g1}(x)$ and $C_{b1}(x)$, each of which is sensitive to the RGB colors, respectively, but not sensitive to the other two colors. The second grating is composed of three adjacent separated gratings, $C_{r2}(\xi)$, $C_{g2}(\xi)$ and $C_{b2}(\xi)$, each one having a lateral dimension of $a_x/3$, which are sensitive to the RGB colors, respectively. The RGB light waves (dotted, dashed and solid line, respectively) are diffracted from the first grating to the second grating and the output light waves which emerge from the second grating are also plane waves normal to the grating's plane, therefore $$-\lambda_c G_{c2}(\xi) = \lambda_c G_{c1}(x) = \sin\alpha_i^1(x) = \sin\alpha_c^2(\xi), c = r, g, b \tag{52}$$

wherein, each light ray is traced from the point x on $G_1$ to the point ξ on $G_2$. Therefore, $$\xi(x) = x + D\tan\alpha_c^2(\xi). \tag{53}$$

Each one of the three sub-gratings of the second grating $C_{rgb2}(\xi)$ can be very efficient to its respective color. Indeed, since the first grating $C_{rgb1}(x)$ is multiplexed of three different gratings, it cannot be 100% efficient. The "cross-talk" between the three gratings can, however, be avoided by placing a color filter having sub-filters $F^r$, $F^g$ and $F^b$ in front of the three gratings $C_{r2}(\xi)$ $C_{g2}(\xi)$ and $C_{b2}(\xi)$ respectively. Since each one of the sub-gratings is now illuminated by a light wave having mostly the "right" color, and only a small percentage thereof is from the "wrong" color, the energy loss due to the filters will be minimal but the "cross-talk" will actually be prevented.

As illustrated in FIG. 8B, the three color separated output light waves from $D_{rgb}$ can be utilize to illuminate three subpixels, each one having its respective DGE $D^c$ (the super script c=r, g, b denotes the color of the respective DGEs). The directions of the three output light waves $W_c^o$ from the subpixels are set by controlling the refractive indices $v^c$ of the substrates which are respectively located inside the three DGEs. As discussed hereinabove with regard to FIGS. 5A and 5B, here too the vertically adjacent gratings in each subpixel, $C_{c2}(\xi)$ and $G_1^c(x)$, can be fabricated separately. There are systems, however, where it is simpler to combine these two grating together into a unified grating having the grating function which is the combination of these two gratings. As previously stated, the specific fabricated method for each system can be determined according to the detailed parameters of each system.

As shown in FIGS. 8A and 8B, there is a shift of D·tan $\alpha_b$ (0) between the two gratings of $D_{rgb}$ wherein, D is the vertical distance between the gratings and $\alpha_b$ (0) is the direction of the blue ray that connect the points x=0 with ξ=0. The overall lateral aperture of the two gratings is, however, equal to $\alpha_x$.

FIG. 8C illustrates two adjacent color-filtered pixels which are illuminated utilizing two respectively contiguous DGEs. As previously, the output light waves $W_c^{oi}$ (i=1,2; c=r, g, b) from the six subpixels are set by controlling the respective refractive index inside the DGE of each subpixels. For a large number n of pixels, the overall aperture of the display will be n $a_x$ and the shift between the plane of the first grating and that of the second gratings will be negligible. As a result, the fill-factor of the display is substantially 1.

In the systems illustrated in FIGS. 8B and 8C, the RGB illumination module based on a DGE is utilized to back illuminate a display, wherein the pixels are designed according to the method illustrated in FIG. 2. Eventually, this illumination method can also be utilize for displays wherein the pixels are designed according the alternative methods illustrated in FIGS. 1, 3 and 6, respectively. Moreover, this illumination method can also be utilized not only for displays wherein the pixels are composed of DGEs, but also for other conventional displays.

FIG. 9A illustrates a method wherein a DGE-based module is utilized to back illuminate a Liquid Crystal Display (LCD), wherein usually a backlight module should be added to the back side of the display. As shown, an illumination element $D_{rgb}$ is located at the back surface of a single pixel 20, which was divided into three subpixels 22, 24, and 26, respectively, and designated for the blue, green and red colors, respectively. The splitting of the three basic colors, $W_r^i$, $W_g^i$ and $W_b^i$, from the input light wave $W_{rgb}^i$, is performed in a similar manner to that described in relation to FIG. 8A. The output light waves, $W_r^o$, $W_g^o$ and $W_b^o$, diverge from the subpixels by a diffuser 28 which is usually a part of the LCD. Typically, the LCD is not illuminated by a combination of three monochromatic light waves, as utilized in FIG. 8A, but rather by a light having combination of three chromatic bands, or even by white light waves. As a result, the efficiencies of the $D_{rgb}$ gratings will not be optimal, and total output efficiency will be degraded, even though the efficiency that may be achieved by a DGE-based illumination module, can be significantly higher than the maximum of 33%, which can be achieved with the existing illumination modules.

FIG. 9B illustrates a method wherein a DGE-based module is utilized to front illuminate a Liquid Crystal on Silicon (LCOS) display. Similar to LCD panels, LCOS panels contain two-dimensional array of cells filled with liquid crystals that twist and align in response to different voltages. With LCOS, the liquid crystal elements are grafted directly onto a reflective silicon chip. According to the liquid crystals that twist following reflection of the mirrored surface below, the polarization of the light is either changed or unchanged, creating bright or dark pixels, respectively. As illustrated, the front surface of the pixel 30, which is divided into three subpixels 32, 34 and 36, is illuminated by the input light wave, $W_{rgb}^i$, in a similar manner to the illumination scheme of the back surface of an LCD, as shown in FIG. 9A. The main difference is that in this case, the output light waves, $W_r^o$, $W_g^o$ and $W_b^o$, do not pass through the pixels, but are rather reflected back from the front surfaces of the pixels, in an opposite direction to their original direction.

An issue which should be taken onto account when designing a front illumination of an LCOS utilizing DGEs is the diffraction efficiencies of the second gratings $C_{c2}(\xi)$. While the polarization of light waves that are diffracted by the gratings of the DGE into the illumination module of an LCD remains the same, the polarization of the light waves which are reflected from "bright" pixels of a LCOS, is rotated by 90°. As a result, the efficiencies of the two orthogonal polarizations passing through the gratings should be taken into account. There are two possible alternatives for efficiently using the scheme illustrated in FIG. 9B, namely, the gratings should either be very efficient, or alternatively, totally inefficient to the orthogonal polarization.

FIG. 10A illustrates a system wherein the gratings are very efficient for the two orthogonal polarizations. As shown, the reflected waves from the two adjacent pixels 40 and 42, are diffracted back, and return to the original locations where they entered the system, substantially normal to the gratings plane, where the two output light waves, $W_{rgb1}^o$ and $W_{rgb2}^o$ from the two pixels 40 and 42, are separated from each other.

FIG. 10B illustrates a different scenario in which the gratings are highly efficient only for the incoming polarization, while the efficiency for the orthogonal reflected polarization is negligible. In this case, the reflected output light waves, $W_{rgb1}^o$ and $W_{rgb2}^o$ from the two pixels 40 and 42, pass without any significant diffraction through the various gratings. The position of the output light waves is now shifted relative to the original entrance location, but the two light waves remain laterally separated. It should be noted that in this configuration the light waves, which are reflected from "dark" pixels, retain their original polarization, and hence, will again be diffracted by the gratings as shown in FIG. 10B. These light waves with the "undesired" polarization, however, will eventually be blocked by a polarizer at the exit surface of the illumination module, and hence their exact locations have no importance.

The situation, however, becomes undesirable for systems wherein the gratings are partially sensitive to the polarization of the reflected light waves. As illustrated in FIG. 10C, a part of the light wave $W_{rgb2}^o$, which is reflected from pixel 42, is again diffracted by the gratings, wherein a part of the other output light wave $W_{rgb1}^o$, which is reflected from pixel 40, passes through the gratings. The two reflected output light waves now at least partially overlap, and as a result the contrast of the image will be severely deteriorated.

The methods illustrated in FIGS. 1-9 for providing display systems in which not only the intensity of the emitted light wave from each pixel, but also the direction of the beam can be controlled, are usable to enable numerous types of displays that can be facilitated by utilizing the existing technologies.

FIG. 11A illustrates the simplest implementation of the DGE-based display. Instead of continuous scanning of the output light wave light, each pixel has only two states. As shown in the Figure, the pixel $P_1$ is in the "off" state, where the controlled refractive index is set to $v_d$, and deviates the output light wave by an angle $P_2$. The deviated light wave is then obstructed by a blocker 44, and is therefore prevented from propagating to the exit pupil of the system. The pixel $P_2$ is set to the "on" state, where the refractive index $v_b$ causes the output light wave to be emitted normal to the pixel plane, and hence, to abort the blocker 44 and continue without interruption to the exit pupil 45 of the system. The grayscale of the pixel can be determined by controlling the ratio of on-time to off-time, for each frame and pixel, respectively. The blocker illustrated in FIG. 11A is merely an example of how to block the deviated light during the off-time. Other methods are possible, including designing the optical system such that the deviated light waves will miss the output aperture of the system, or alternatively, placing the blocker in another location. The location to which the undesired light waves are diverted is usually called a heat sink or a light dump.

The output light waves illustrated in FIG. 11A are plane waves. In most of the displays, however, it is required that the emitted light waves fill the output aperture (or the required viewing angles for flat screens), and therefore, as illustrated in FIG. 11B, the output light waves should be diverged into a pre-defined solid angle $\Delta\theta$. The divergence of the light waves is partially achieved by some of the basic optical parameters of the system, such as the pre-divergence of the input light waves, the chromatic bandwidth of quasi-monochromatic light sources and the diffraction from the finite size of the pixel. The exact required divergence of the light beams may be obtained by adding an angular-selective diffuser 46 at the exit surface of the pixel, or alternatively, at the input surface. In any case, care should be taken during the optical design of the display that the entire diverged light waves in the "off" state will go to the heat sink, and not pass the output aperture of the system.

The bi-state operation principle of the displays illustrated in FIGS. 11A and 11B is similar to that of a Digital Light Processing (DLP) in which each pixel is composed of a tiny mirror that can rapidly be repositioned to reflect light either through the output aperture of the system, or onto a heat sink. The main advantage of the present invention over the DLP is that the main principle is based on a transmission of light through the display, as opposed to the DLP where the light is reflected from the display. As a result, the optical design here will be much simpler and the overall volume may be much smaller than that of a DLP.

In order to understand the potential of the new display technology, wherein for each pixel not only the intensity of light wave which is emitted is controlled, but also the direction of the emitted wave, it is important to understand the principle of the displays. FIG. 12 illustrates a prior-art, conventional flat display 50, wherein for any given frame time each pixel emits a diverging light wave having an expanding angle of $\varphi_{FOV}$. This angle usually denotes the actual field of view (FOV) of the display and for a high-quality flat screen it can reach up to $2\pi$ steradian solid angle. The main outcome of the principle of operation is that for any given time frame, each pixel emits the same information to all directions. As a result, the same light from pixel 52 impinges on both of the viewer's eyes 54 (neglecting small variations of intensity). Consequently, the viewer sees the same image from any relevant viewpoint, and the image is considered two-dimensional.

A totally different display principle in which the direction of the light emitted from each pixel, can be controlled utilizing DGE based pixels, is illustrated in FIG. 13. As shown, during two different times $t_1$ and $t_2$ in the same frame time, namely, for $t_1$ and $t_2$ fulfilling the condition of $0<t_1<t_2<T_f$, wherein $T_f$ is the duration of the frame time of the display, two different output light waves $W_o(t_1)$ and $W_o(t_2)$ are emitted from the display 56. Indeed, the two light waves are emitted on two different occasions however, since they are included inside the same frame time, they will actually appear simultaneously to the viewer's eyes. The reason for this is the persistence of vision, wherein multiple discrete images blend into a single image in the human mind. As a result, two different rays 59a and 59b originating from the two images $W_o(t_1)$ and $W_o(t_2)$, are emitted during the same frame time from pixel 58 and impinge on the viewer's eyes, 60a and 60b, respectively. Consequently, the viewer can see the two different images from two viewpoints and can conceive the image as a stereoscopic one.

A three-dimensional image, having many more than two different viewpoints, can actually be obtained by the DGE scanning technology. At the first stage, a display system having a three-dimensional effect only in the horizontal axis x is considered. It is assumed that it is necessary for any emitted image from the display, at any given time frame, should consist of n different sub-images in n viewpoints $v_j$ (j=1 . . . n) along the x axis. To achieve this, the emitted image wave $W_o$ from each pixel should be scanned along the x axis during the time frame to cover the entire solid angle of the FOV, namely, to each required viewpoint $v_j$ (assuming that they are uniformly located over the FOV), a viewing angle $\varphi_j$ is designated whereby the scanned wave is deviated at time $t_j$.

FIG. 14 illustrates a pixel wherein the refractive index $v(t)$ between the two gratings is modified as a function of time. As shown, at two different times, $t_1$ and $t_2$, in the same time frame, the image wave is deviated to two different angles $\varphi_1$ and $\varphi_2$, respectively. For each viewpoint, $v_j$ a maximal time slot of $\Delta\tau=T_f/n$ is dedicated, whereby the output light wave is deviated to this specific viewpoint. One possible method for controlling the intensity of the output light wave at each viewpoint is by placing a conventional LCD in front of the external gratings $G_2(\xi)$. With the minimal response rate achievable in the existing LCD technology, however, only a very small number of different viewpoints can be achieved. It is therefore preferable to use an alternative method by controlling the angular scanning velocity of the output light wave $W_o$, namely, for each viewpoint $v_j$ and each pixel at any given time frame, an actual time slot $\Delta\tau_j$ is dedicated wherein, $0\leq\Delta\tau_j\leq\Delta\tau$. The grayscale of the light wave is determined by the time $\Delta\tau_j$, wherein for a totally dark pixel $\Delta\tau_j=0$ and for a totally bright pixel $\Delta\tau_j=\Delta\tau$. Only for a bright pixel over the entire FOV is the condition $\Sigma_{j=1}^{n} \Delta\tau_j=T_f$ fulfilled. For most of the cases $\Sigma_{j=1}^{n} \Delta\tau_j<T_f$, and hence, for any time t that fulfils $\Sigma_{j=1}^{n} \Delta\tau_j<t<T_f$, the output light wave is deviated into the heat sink.

As illustrated in FIG. 15, which shows two consecutive output light waves $W_o(t_j)$ (solid lines) and $W_o(t_{j+1})$ (dashed lines), in order for the scanned wave to cover the entire FOV without gaps in the image, the angular divergence of the wave should be $\Delta\varphi=\varphi_{FOV}/n$. Practically, it would be much simpler to deviate the output light wave by a continuous scanning, rather than by a discrete number of deviations, and therefore, the grayscale of the output light wave $W_o(t_j)$ will be determined by the angular scanning velocity $$\omega_i = \frac{\Delta\varphi}{\Delta\tau_j}.$$

The time $t_j$ that a specific pixel will emit the output light wave to a given direction $\varphi_j$, depends on the brightness of the previous angles and the actual velocity of the angular scanning prior to that time. Specifically, $$t_j = \Sigma_{i=1}^{j-1} \Delta\tau_i. \tag{54}$$

As a result, since the scanning angular velocity depends on the overall brightness of the specific pixel $t_j$, it is therefore different for each pixel, and consequently, the light waves from the various pixels will arrive into the viewpoint $v_j$ at different times. All of these times, however, are contained in the same time frame, namely, $0\leq t_j\leq T_f$ for all the pixels in the display. Therefore, because of the persistence of vision, the light waves from all the pixels will be integrated into the viewer's eye, thereby creating a single image.

An important issue to take into account is the luminance $L_v$ (i.e., emitted energy per unit time per unit solid angle per unit projected source area) of the projected image. Seemingly, since an output light wave from a bright point is emitted only for a time of $\Delta\tau$, which is lower by a factor of n than the emitting time $T_f$ of a conventional display, and both times are smaller than the integration time of the eye, the brightness to the viewer's eye will be lower by the same factor n, accordingly. This brightness decrease may be compensated by the lower angular divergence of the emitted light wave. As explained above, the angular dispersion of the output light wave in the display illustrated in FIGS. 14 and 15 is $\Delta\varphi=\varphi_{FOV}/n$, while for a conventional display it is $\varphi_{FOV}$, namely, $$\varphi^{dge} = \frac{\varphi^{con}}{n}, \tag{55}$$

wherein, the superscript dge and con denote the parameters of DGE-based and conventional displays, respectively. It is assumed that the luminous emittance $M_v$ (i.e., emitted energy per unit time per unit projected source area) of the light waves is the same for the two displays, hence, $$M_v^{dge} = M_v^{con}. \quad (56)$$

Combining Eqs. (55) and (56) yields:

$$L_v^{dge} = \frac{M_v^{dge}}{\varphi^{dge}} = \frac{n \cdot M_v^{con}}{\varphi^{con}} = n \cdot L_v^{dge}. \quad (57)$$

This means that the instantaneous luminance of the DGE-based display is higher by a factor of n than that of a conventional display which compensates the shorter time illumination of the former display. As described above, part of the required divergence of the output light wave $\varphi_p$ is achieved by the basic optical parameters of the system. As previously stated, the exact required divergence of the light beams can be obtained by adding an angular-selective diffuser 62 (FIG. 15) at the exit surface of the pixel, or alternatively, at the input surface, the main difference here being that a different divergence is required along the x and the y axes. While the required divergence in the x axis is $\Delta\varphi$, for the y axis the beam should cover the entire FOV and the required divergence angle is $\varphi_{FOV}$. To achieve this requirement, a non-symmetrical angular-selective diffuser may be used, wherein the diffusion angle along the x axis is much narrower than that along the y axis. Assuming that the $FOV_x$ along the x axis is different than $FOV_y$ along the y axis, yields the following required diffuser's angles:

$$\varphi_{difx} = \frac{\varphi_{FOVx}}{n} - \varphi_p; \varphi_{dify} = \varphi_{FOVy} - \varphi_p. \quad (58)$$

So far, it has been assumed that the three-dimensional effect is required only along the x axis, when actually, depending on the scanning capabilities of the system, it is possible to achieve this effect also along the y axis. Assuming that instead of a single viewpoint $v_j$ on the viewing angle $\varphi_j$, a vertical row of m different viewpoints are required, namely, the image is composed of a total number of n*m different viewpoints $v_{ji}$, each having two orthogonal viewing angles $(\varphi_{xj}, \varphi_{yi})$. The two-dimensional scanning can be performed using the methods described above in relation to FIGS. 5 and 6. The various parameters of the system will now be:

$$\Delta\tau = \frac{T_f}{n \cdot m}; \Delta\varphi_x = \frac{\varphi_{FOVx}}{n}; \Delta\varphi_y = \frac{\varphi_{FOVy}}{m}. \quad (59)$$

For each pixel and each viewing angle $v_{ij}$ at any frame time, an actual time slot $\Delta\tau_{ji}$ is dedicated according to required brightness. Assuming that the scanning is performed by covering horizontal rows one by one, the emitting time $t_{ji}$ for each viewpoint $v_{ji}$ is:

$$t_{ji} = \Sigma_{k=1}^{i-1}\Sigma_{l=1}^{n}\Delta\tau_{lk} + \Sigma_{l=1}^{j-1}\Delta\tau_{li}, \quad (60)$$

and the angular scanning velocity is $$\omega_{ji} = \frac{\Delta\varphi_x}{\Delta\tau_{ji}}.$$

The images created in the embodiments illustrated in FIGS. 13-15 are monochromatic images, which were produced utilizing a monochromatic light wave, however, full-color images can easily be achieved utilizing color-sequential, or alternatively, color filter pixels, as described hereinabove with regard to FIGS. 8-10.

FIGS. 13-15 illustrate systems wherein the display emits for any given frame a discrete number of n different images into n different viewpoints, arranged in one-dimensional or two-dimensional array. It will be advantageous, however, to exploit the technology of DGEs based display described in this invention, to obtain a full continuous three-dimensional display, as is the case in holographic displays. The recording and readout principles of a holographic display are illustrated in prior art FIGS. 16A and 16B, respectively. As shown in FIG. 16A, an interference pattern of two coherent light waves, the object and the reference waves, is created on the holographic plate 63. Usually the object wave is scattered from a diffusive object, while the reference wave is a simple plane wave that can easily be reconstructed, wherein the two interfering waves have to originate at the same coherent source, usually a laser beam. As illustrated, the reference ray 64 interferes at a point 65 on the holographic plate 63 with three different rays, 66, 67 and 68, emitted from three points 70, 72, and 74, respectively, on an object 75, namely, a multiple interference pattern is created on point 65. In actual fact, the interference pattern contains many more than three different patterns, since the object essentially emits a continuum of rays; only three rays are plotted here for the sake of simplicity. A similar multiple interference pattern is created on point 78, where the reference ray 76 interferes with three different rays, 80, 82 and 84, emitted from the same three points 70, 72, and 74, respectively. Similar interference patterns are created as a result of the interference between the various rays of the object and the reference waves. The interferences patterns are usually recorded on a very high-resolution photographic emulsion, which is converted after the developing process into a complicated diffraction grating.

The reconstruction process of the holographic display is illustrated in FIG. 16B. A reconstructing wave, which is similar to the reference wave, illuminates the developed holographic plate 63. The reconstructing ray 86, originating from the same direction as the reference ray 64 of FIG. 16A, is diffracted from the interference pattern at point 65, to create three image rays, 66", 67" and 68", which are emitted from the plate at the same directions that the rays 66, 67 and 68 (FIG. 16A) and impinge on the plate during the recording process. As a result, the viewer's eye 90 sees these rays as they are the rays 66', 67' and 68', which are emitted from the points 70, 72, and 74 on the object 75. Similarly, the reconstructing ray 89, originating from the same direction as the reference ray 76 (FIG. 16A), is diffracted from the interference pattern at the point 78 to create three image rays, 80", 82" and 86", and the viewer's eye 91 sees these rays as they are the rays 80', 82' and 86', which are emitted from points 70, 72, and 74. The rays 66', 67' and 68' as well as rays 80', 82' and 86', are not real, but rather virtual rays, and therefore, a virtual image 75' is created at the location of the original object 75. Similar diffraction of the reconstructing light wave occurs at all the other points of the holographic plane 63, and the viewer sees a virtual three-dimensional image as it appears from a "window" located at the position of the holographic plate.

The main drawback of the photographically recorded holographic display is that it can project only static images. In order to facilitate a dynamic holographic display, a dynamic spatial light modulator (SLM) is required, which SLM can produce, in real time, the required complicated diffraction pattern that will be able to diffract a simple reconstructing light wave into the desired dynamic three-dimensional image. Even with the most advanced currently existing projection technologies, however, the highest achievable resolution is still lower by an order of magnitude than the required resolution for the dynamic display, which should be a sub-wavelength, i.e., a few thousands line-pairs per millimeter.

An alternative approach for achieving a dynamic three-dimensional display by utilizing DGE based pixels, according to the present invention, is illustrated in FIG. 17. Instead of using a dynamic grating, an array of fixed gratings producing the DGE-based display 93 is utilized, wherein the dynamic image is produced by scanning the output light wave at each pixel in a manner that imitates the diffraction of the reconstructing light wave from a dynamic grating. As illustrated, an input ray 95 that illuminates a pixel 97 is scanned at a given time frame in various directions by the method similar to the one described hereinabove with regard to FIGS. 14-15. The main difference is that now the output light wave is scanned continuously to create the pattern of the required virtual image, as seen at the location of the pixel 97. As further shown, three different output rays 100, 101 and 102 are emitted from pixel 97, and the viewer's eye 90 sees these rays as rays 100', 101' and 102', which are emitted from the points 70, 72, and 74 on the virtual image 75'. Similarly, the input ray 96 is scanned at pixel 98 to create three image rays, 105", 106" and 107", and the viewer's eye 91 sees these rays as rays 80', 82' and 86', which are emitted from the points 70, 72, and 74. It should be noted that here the rays which create the virtual image 75', are not emitted simultaneously as is the case in a holographic display, but rather sequentially. As a result, a very fast scanning is required to create a detailed image. Naturally, the resolution of the projected virtual image is determined by the achievable scanning velocity of the system. The above description applies only for a single time frame, wherein a single three-dimensional virtual image is formed. Obviously, on any time frame, a different image may be created, and therefore, the display can from a dynamic virtual image which will be projected into the viewer's eyes. Full-color images can easily be constructed utilizing color-sequential, or alternatively, color filter pixels, as described hereinabove in relation to FIGS. 8-10.

Another appealing application that can be provided using the technique described herein is that of Fourier-transform displays. In almost all of the existing display sources, the image plane coincides with the display plane, namely, the light waves emitted from the display create an image which is located on the display plane, and each point of the image is represented by a single pixel located at a specific location on the display. There are many applications however, such as bi-oculars, head-up displays (HUDs) and HMDs, wherein the required image should be collimated to infinity. In these systems, each point of the image is represented by a single plane wave impinging on the viewer's eye from a specific viewing angle. Usually, in order to achieve the required collimated image, the image from a conventional display source is collimated to infinity utilizing an optical module. In other words, the collimating optical module performs a Fourier transform of the real image of the display and each diverging light wave from a single pixel is transformed into a plane wave which arrives from a specific direction. For most of the applications, especially for those in which wide FOV or high performance is required, the collimating optical module becomes large, heavy, cumbersome and expensive, significantly complicating the fabrication of the required system. This drawback is particularly severe for optical systems such as HMDs, wherein compactness and light weight are crucial parameters. Another drawback of these systems is that the collimating module, even for the high-end applications, usually imposes undesired aberrations into the collimated waves which degrade the optical quality of the image.

In order to a overcome these drawbacks, it would be preferable to have a display source that emits an assembly of plane waves instead of the diverging light waves which are emitted from the present displays. One approach for achieving this goal is to utilize a high resolution SLM, wherein the light waves which are emitted from the display plane are modulated according to the Fourier-transform of the required image. This can be achieved if the transparency of the SLM itself will be modulated as the Fourier transform of the real image and by illuminating the SLM plane with a simple plane wave such that the output light wave will be modulated accordingly. The main problem with this approach is that to achieve the required modulation, especially for an image having a wide FOV, very high resolutions in the order of a few thousands line-pairs per millimeter, are required. As explained above in relation to the holographic displays, this type of high resolution SLM does not presently exist, and probably will not exist in the foreseeable future.

A possible method for achieving the required Fourier-transform displays is to use the same method described hereinabove in relation to achieving dynamic holographic-like three-dimensional displays. The required modulation of the SLM plane can be described as an interference pattern between a simple reference illuminating plane wave and the required image which is collimated to infinity. When an SLM, modulated according to this interference pattern, is illuminated by a readout wave which is similar to the reference wave, the diffracted output light waves will be the required collimated image. Therefore, the same technique which is illustrated in relation to FIG. 17, can be utilized here to "imitate" the required spatially modulated display, namely, each pixel in the display will emit an assembly of light waves during any given frame rate, similar to those that should be diffracted from the SLM plane when illuminated by the proper readout wave. Eventually, the outcome will be the same and the output light waves will be the required Fourier transform of the real image.

In all of the embodiments illustrated in FIGS. 11-17, it was assumed that the viewer's position is unknown and that the image emitted from the display should cover an entire designated FOV, wherein the viewer's eyes can be positioned anywhere inside this FOV. It is possible, however, to further improve the performance and the brightness of the projected image, as well as to significantly simplify the operation of the display, by adding an eyeball tracking unit to the optical system. Eyeball tracking is the process of measuring either the location, the point of gaze or the motion of an eye relative to the display, namely, an eyeball tracker is a device for measuring eye positions and eye movement. The most popular method for operating this device is by utilizing an optical method for measuring eye motion. Light from an emitter, typically infrared, is reflected from the eye and sensed by a video camera, or some other specially designed optical sensors. The information is then analyzed to extract eye rotation and translation from changes in reflections. Video-based eye trackers typically use corneal reflection and the center of the pupil as features to track over time.

In accordance with the present invention, it would be advantageous to physically combine the two optical units, namely, the dynamically controlled stereoscopic display and the eyeball tracking unit. By identifying the position and gazing point of the viewer's eyes, the control unit could be set for each pixel at each time frame so that the preferred direction that the pixel should emit the light wave, and the context of the image could be adjusted according to the data received by the eyeball tracking unit. The display can project different images for the two eyes of the viewer, to facilitate a stereoscopic image, utilizing the dynamically controlled pixels. Moreover, completely different images can be projected simultaneously by the display to different users.

Usually, from symmetry consideration, it would be preferable to install the eyeball tracking unit at a central top position of the display module. FIGS. 18A-18B illustrate a top view (FIG. 18A) and a front view (FIG. 18B) of an eyeball tracking unit 108, comprising an emitter 109 and a detector 110 which are installed at the central top position of a frame of a display module 111. As shown, light rays 112a and 112b emerge from the emitter 109 to illuminate the viewer's eyes 114a and 114b, respectively. The light rays 116a and 116b, respectively, reflected from the viewer's eyes, are focused into the detector 110. The data collected in the detector 110 is transmitted to a processing unit 118, which dynamically calculates the positions, as well as the gazing points of the eyes, and accordingly determines the direction that each pixel should emit the light wave, as well as the context of the image. The processed data is transferred into a control unit 120 which feeds the display with the processed video signal. This additional capability can enhance the performance of the embodiments illustrated in FIGS. 11-17.

FIG. 19 illustrates an upgraded version of the system illustrated in FIGS. 11A-11B above. As illustrated in relation to the later figures, the scanning capability of the DGE-based pixels was degenerated there only to a bi-state operation mode. In the modified system illustrated in FIG. 19, however, the full scanning capability has been regenerated. Each pixel can now be, in addition to the "off" state, where the controlled refractive index is set to $v_d$, deviates the output light wave by an angle $\varphi_d$, and directs the light wave to the heat sink, in a continuum of states wherein the refractive index $v_b$ deviates the output light wave by an angle $\varphi_b$. The deviation angle of each pixel is set by the control unit according to the position of the viewer's eyes. The divergence angle $\Delta\theta'$ of each pixel set by the diffuser 46, can now be significantly smaller than that of the system illustrated in FIG. 11B, where the light wave should cover the entire FOV. As a result, a much higher brightness, or alternatively, considerably lower power consumption may be achieved. There are some alternatives in which the modified embodiment of FIG. 19 can be achieved. In one option, each pixel is directed to the viewer's head and should cover both eyes. As a result, a conventional two-dimensional image is projected into the viewer's eyes, but the operation mode is very simple and the improvement in the achievable brightness remains significant. In this option, few different conventional two-dimensional images can be projected simultaneously to the eyes of different users. In a different option, in each time frame the pixels project the light waves sequentially into the two eyes of the viewer. Each time frame is divided into three time slots for each pixel: two for the eyes and the third for the heat sink, where the duration of each slot is determined according to the brightness of the projected light waves. The projected image in this version can be stereoscopic, and since the required light wave divergence is even more reduced, the achievable brightness can be further improved accordingly. In a modified version the pixels array is separated into pairs of pixels, where in each pair, the two pixels project the light waves into the two eyes, respectively, namely, each single pixel emits the light waves toward a single eye. As shown in FIG. 19, the controlled refractive indices of the DEGs, $DEG_1$ and $DEG_2$ are set to $v_{d1}$ and $v_{d2}$, which deviate the output light waves by the angles $\varphi_{d1}$ and $\varphi_{d2}$ toward the left and the right eyes of the viewer, respectively. Although the resolution for each eye is reduced by a factor of two as compared to the previous option, controlling the image here is much simpler.

FIG. 20 illustrates a modified version of the embodiment illustrated in FIGS. 14 and 15, wherein the system is designated for a multi-viewer operation. Assuming that k different viewers are watching the display simultaneously, instead of projecting n*m different images in n*m time slots for each frame time to cover the entire FOV, each pixel emits 2k different images to 2k directions in order to cover the 2k different EMBs of the k viewers. Since even for a large number k of viewers, the total area of all the EMBs is just a small fraction of the entire FOV, the divergence angle $\Delta\varphi'$ can be significantly smaller than the divergence angle required for the system of FIG. 15 and the brightness, as well as the power consumption, can be improved accordingly. Most importantly, since each pixel can continuously follow the eye's movements, the image can now be more continuous with higher resolution and a simpler control mechanism.

FIGS. 21A and 21B illustrate a modified version of the holographic display illustrated in FIG. 17. As shown in FIG. 21A, an eyeball tracking unit 108 is located on the frame of the display 93 and measures the position as well as the gaze direction of the eyes 114a and 114b. Accordingly, as illustrated in FIG. 21B, each pixel should continuously scan the output light wave to create the pattern of the required virtual image into a solid angle that covers the viewer's eye, which is smaller by a few orders of magnitude than the solid angle required in the embodiment of FIG. 17. As a result, the feasibility of the scanning system here is much more realistic and it can now easily be achieved. Moreover, since the gazing direction of each eye is known, only the pixels that the eye looks at should emit a high resolution image, wherein the pixels located further away from the gazing points, can emit image with lower resolution, even further simplifying the scanning system.

The embodiments illustrated in FIGS. 18-21 have some prominent advantages as compared to those illustrated in FIGS. 11-17. In addition to the significantly higher achievable brightness (or conversely, lower power consumption), a much simpler control mechanism and better feasibility, there are many applications that can be achieved when combining the dynamically controlled display with an eyeball tracking unit. Concerning a single-viewer mode, different aspects of a scene can be projected to the viewer's eyes according to the location, as well as the gazing point of the viewer's eyes. Moreover, completely different scenes or different contexts can be projected accordingly. In addition, the viewer can operate the display by blinking his eyes or merely moving. Furthermore, the system can be programmed to change the mode of operation according to the situation of the viewer's eyes, for example, pausing the image projection while the viewer turns his head, or starts napping for more than a preset time period, and renewing it when he turns his gaze back. Regarding a multi-viewer mode, different aspects of the same scene (for example, different aspects of the same sport event or the same show) can be projected simultaneously for different users, according to their specific positions or preferences. In addition, the system can pause the projection for one user in one of the above-mentioned conditions, while continuing to project the images to the other users. Moreover, completely different scenes for different users can be projected simultaneously, for example, a few viewers can sit together while each one watches his own preferred movie or TV show, or a few players can play the same video game, while the system projects his respective context for each player. Naturally, for the last mentioned applications, each viewer should use his own headset, in order to hear the appropriate audio signal.

In addition to the entertainment applications described above, the embodiments of FIGS. 18-21 can also be used for professional applications where it is required to continuously project updated data to the viewers' eyes. In a surgery room, for example, there is a large screen that projects vital data to the medical staff. Different members of the medical staff, however, i.e., the surgeons, nurses and anesthesiologists, usually require different kinds of data. By utilizing the above embodiments, it is possible to simultaneously project from the same screen different data to the various people in the surgery room, according to their different requirements. Another example is a control room, wherein a huge screen constantly projects an updated situation report. Different participants may, however, need to see different scenarios or different aspects of a given scenario, at any given time. Here again, the different scenarios can simultaneously be projected to the respective participants, according to their requirements.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical display system, comprising: a light source; a control unit; and
   an array of at least two pixels, each of the pixels being a juxtaposed double grating element, comprising a first grating and a second grating spaced apart at a constant distance from each other, each of the two gratings having at least two edges, at least one sequence of a plurality of lines and an apertures,
   the spacing between the lines gradually changing over the aperture of the gratings,
   the first grating diffracting a light wave from the light source towards the second grating, the light wave further diffracted by the second grating as an output light wave in a given direction,
   wherein for each of the pixels the direction of the output light wave from the second grating is separately, dynamically and externally controlled by the control unit.

2. The optical display system according to claim 1, wherein the pixels further comprising a light transmitting substrate having at least two major surfaces located between the first and the second gratings, wherein the refractive index of the light transmitting substrate is externally controlled and the direction of the output light wave from the second grating is controlled by changing the refractive index of the substrate.

3. The optical display system according to claim 1, wherein for each pixel at least one of the two gratings is laterally displaceable and the direction of the output light wave from the second grating is controlled by a lateral displacement of one of the gratings with respect to the other.

4. The optical display system according to claim 1, wherein the pixels further comprise a third grating, located in front of the first grating, having at least one major axis, wherein the third grating is rotatable about a major axis and the direction of the output beam from the second grating is controlled by a rotation of the third grating.

5. The optical display system according to claim 1, wherein each of the pixels further comprising additional third and fourth gratings, each grating having at least two edges, located at a constant distance from each other, each of the additional gratings comprising at least one sequence of a plurality of lines, wherein the spacing between the lines gradually changes over the aperture of the grating, and wherein the third grating is diffracting the output light wave from the second grating into the fourth grating and the light wave being diffracted by said fourth grating as an output light wave from the pixel in a given direction, wherein for each pixel the direction of the output light wave from the second grating is deviated along a first axis, and the direction of the output light wave from the fourth grating is separately, dynamically and externally controlled by the control unit, and is deviated along a second axis, different than the first axis.

6. The optical display system according to claim 1, wherein the sequence of the plurality of lines of at least one of the gratings has a radial symmetry, for each pixel at least one of the two gratings is laterally displaceable, the direction of the output light wave from the second grating is controlled by a lateral displacement of one of the gratings with respect to the other, and the direction of the output light wave from the second grating can be deviated along two different axes.

7. The optical display system according to claim 1, wherein at least one of the gratings is multiplexed of three different gratings sensitive to three different colors, respectively, and each of the gratings is not sensitive to the other two colors.

8. The optical display system according to claim 7, wherein the first grating is multiplexed of three different gratings sensitive to three different colors respectively, and the second grating comprising three different laterally displaced gratings is sensitive to the same three different colors, respectively.

9. The optical display system according to claim 7, wherein the pixels further comprising three different color filters, each one of the filters is transparent to one of said three different colors and substantially non-transparent to the other two colors.

10. The optical display system according to claim 1, further comprising an exit pupil wherein the output light waves from the pixels can be deviated by the control system into the exit pupil or outside of the exit pupil.

11. The optical display system according to claim 1, wherein the optical display system projects a stereoscopic dynamic image into eyes of a viewer.

12. The optical display system according to claim 1, wherein the optical display system projects at least two different images into different viewing angles.

13. The optical display system according to claim 1, further comprising an eyeball tracking unit for detecting position or gazing points of a viewer's eye and a processing unit for processing data collected by the eyeball tracking unit and for transferring the data to the control unit.

14. The optical display system according to claim 13, wherein the direction of the output light waves from the pixels or the context of a projected scene is set by a position or the gazing point of the viewer's eye, and the output light waves from the pixels are directed into the viewer's eyes.

15. The optical display system according to claim 14, wherein different images are projected into the two eyes of the viewer.

16. The optical display system according to claim 14, wherein the divergence of the output light waves is set to cover an eye-motion box of the viewer.

17. The optical display system according to claim 13, wherein the system stops projecting an image when the gazing point of the viewer is not directed to the display.

18. The optical display system according to claim 13, wherein the eyeball tracking unit tracks the position or the gazing point of more than one viewer, and scenes from the display aresimultaneously projected to different viewers.

19. The optical display system according to claim 1, wherein the pixels comprise Fresnel elements.

20. The optical display system according to claim 1, wherein the light source is a white light source.

* * * * *